(12) United States Patent
Liu et al.

(10) Patent No.: US 12,079,130 B2
(45) Date of Patent: Sep. 3, 2024

(54) METHOD AND APPARATUS FOR PROCESSING DATA BASED ON BLOCK CHAIN, DEVICE AND READABLE STORAGE MEDIUM

(71) Applicant: TENCENT TECHNOLOGY (SHENZHEN) COMPANY LIMITED, Shenzhen (CN)

(72) Inventors: Qucheng Liu, Shenzhen (CN); Maocai Li, Shenzhen (CN); Zongyou Wang, Shenzhen (CN); Li Kong, Shenzhen (CN); Hu Lan, Shenzhen (CN); Pan Liu, Shenzhen (CN); Kaiban Zhou, Shenzhen (CN); Gengliang Zhu, Shenzhen (CN); Yifang Shi, Shenzhen (CN); Huankun Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 14 days.

(21) Appl. No.: 17/985,375

(22) Filed: Nov. 11, 2022

(65) Prior Publication Data

US 2023/0074102 A1 Mar. 9, 2023

Related U.S. Application Data

(63) Continuation of application No. PCT/CN2022/071575, filed on Jan. 12, 2022.

(30) Foreign Application Priority Data

Jan. 20, 2021 (CN) .......................... 202110074890.0

(51) Int. Cl.
*G06F 12/0875* (2016.01)
*G06F 12/0804* (2016.01)
(Continued)

(52) U.S. Cl.
CPC ...... *G06F 12/0875* (2013.01); *G06F 12/0804* (2013.01); *G06F 12/0893* (2013.01); *G06F 16/27* (2019.01); *G06F 2212/163* (2013.01)

(58) Field of Classification Search
CPC ............. G06F 12/0875; G06F 12/0804; G06F 12/0893; G06F 16/27; G06F 2212/163;
(Continued)

(56) References Cited

U.S. PATENT DOCUMENTS

2020/0034395 A1 1/2020 Lu
2020/0052884 A1 2/2020 Tong et al.
2022/0229577 A1 7/2022 Liu

FOREIGN PATENT DOCUMENTS

CN 108776897 A 11/2018
CN 109145205 A 1/2019
(Continued)

OTHER PUBLICATIONS

China National Intellectual Property Administration (CNIPA) Office Action 1 for 202110074890.0 Mar. 3, 2021 14 Pages (including translation).

(Continued)

*Primary Examiner* — Nanci N Wong
(74) *Attorney, Agent, or Firm* — ANOVALAW GROUP PLLC

(57) ABSTRACT

This application discloses a method and apparatus for processing data based on a block chain. The method includes adding transaction data in at least two blocks into an execution queue according to a block height sequence and transaction data sequence numbers; executing contract services and acquiring a read cache and a write cache of a parallel transaction generated by executing each contract service, the at least two pieces of transaction data comprising target transaction data; determining a write cache of a (Continued)

merged transaction in block caches, and acquiring a read cache of an updated transaction; determining a write cache of the transaction to be merged of the target transaction data according to the read cache of the updated transaction; and merging the write cache of the transaction to be merged of the target transaction data into a block cache to which the target transaction data belongs.

20 Claims, 10 Drawing Sheets

(51) Int. Cl.
  *G06F 12/0893* (2016.01)
  *G06F 16/27* (2019.01)
(58) Field of Classification Search
  CPC . G06F 16/2379; G06F 16/24552; H04L 9/50; G06Q 20/389; G06Q 40/04
  See application file for complete search history.

(56) References Cited

FOREIGN PATENT DOCUMENTS

| | | | |
|---|---|---|---|
| CN | 110457353 | A | 11/2019 |
| CN | 111309711 | A | 6/2020 |
| CN | 111694825 | A | 9/2020 |
| CN | 112395300 | A | 2/2021 |

OTHER PUBLICATIONS

The World Intellectual Property Organization (WIPO) International Search Report for PCT/CN2022/071575 Apr. 13, 2022 7 Pages (including translation).

METHOD AND APPARATUS FOR PROCESSING DATA BASED ON BLOCK CHAIN, DEVICE AND READABLE STORAGE MEDIUM

RELATED APPLICATIONS

This application is a continuation of PCT Application No. PCT/CN2022/071575, filed on Jan. 12, 2022, which in turn claims priority to Chinese Patent Application No. 202110074890.0, entitled "METHOD AND APPARATUS FOR PROCESSING DATA BASED ON BLOCK CHAIN, DEVICE AND READABLE STORAGE MEDIUM" and filed with the China National Intellectual Property Administration on Jan. 20, 2021. The two applications are incorporated herein by reference in their entirety.

FIELD OF THE TECHNOLOGY

This application relates to the technical field of the Internet, and particularly relates to a technology for processing data based on a block chain.

BACKGROUND OF THE DISCLOSURE

With the emphasis on transaction data security, governments and enterprises have begun to store transaction data with block chain networks.

Blocks in most of the block chain networks in the industry are serially executed according to the sequence of the block height, and contract services corresponding to the transaction data in the blocks are also serially executed according to the sequence of the transaction data sequence number. For example, a block m includes transaction data 1, transaction data 2, . . . , transaction data n. When processing the transaction data of the block m, the contract service corresponding to the transaction data 1 is first executed to obtain a transaction execution result 1 of the transaction data 1, then a contract service corresponding to the transaction data 2 is executed according to the transaction execution result 1 and the transaction data 2 to obtain a transaction execution result 2 of the transaction data 2, and corresponding contract services are continuously executed on the subsequent transaction data. After the transaction data of the block m is processed, the transaction data 1 of the block m+1 is then processed.

However, such a transaction data processing mode cannot support the increase speed of the transaction data received by the block chain network, consequently, a large amount of transaction data is retained in the block chain network, and the efficiency of processing the transaction data in the block is low.

SUMMARY

An embodiment of this application provides a method and apparatus for processing data based on a block chain, a device and a readable storage medium, aiming at improving the efficiency of processing transaction data with block chain networks.

One aspect of this application provides a method for processing data based on a block chain. The method is executed by a computer device and includes adding transaction data in at least two blocks into an execution queue according to a block height sequence and transaction data sequence numbers, and acquiring at least two pieces of transaction data from the execution queue in sequence, the at least two pieces of transaction data carrying contract information; executing contract services corresponding to the contract information carried by the at least two pieces of transaction data in parallel, and acquiring a read cache and a write cache of a parallel transaction generated by executing each contract service, the at least two pieces of transaction data comprising target transaction data; determining a write cache of a merged transaction in block caches respectively corresponding to the at least two blocks, and acquiring a read cache of an updated transaction corresponding to the target transaction data in the write cache of the merged transaction, a position or addition time of the transaction data corresponding to the write cache of the merged transaction in the execution queue being in front of the target transaction data; determining a write cache of the transaction to be merged of the target transaction data according to the read cache of the updated transaction, the read cache of the parallel transaction corresponding to the target transaction data and the write cache of the parallel transaction corresponding to the target transaction data; and merging the write cache of the transaction to be merged of the target transaction data into a block cache to which the target transaction data belongs, and continuously merging a write cache of the transaction to be merged of the transaction data next to the target transaction data.

Another aspect of this application provides a computer device, including: a processor, a memory and a network interface, the processor being connected to the memory and the network interface, the network interface being configured to provide a data communication function, the memory being configured to store a computer program, and the processor being configured to invoke the computer program, to cause the computer device to perform the method in the embodiments of this application.

According to another aspect of this application, a computer-readable storage medium is provided, storing a computer program, the computer program being applicable to be loaded and executed by a processor to perform the method in the embodiments of this application.

In embodiments of this application, the contract services corresponding to the at least two pieces of transaction data can be executed in parallel according to the contract information carried by the at least two pieces of transaction data respectively. The at least two pieces of transaction data are arranged according to the block height sequence and the transaction data sequence numbers. The read cache of the parallel transaction and the write cache of the parallel transaction generated by executing each contract service are acquired. The read cache of the parallel transaction corresponding to the target transaction data may be an older transaction read cache, so the write cache of the merged transaction is determined in the block caches corresponding to the at least two blocks, and then the read cache of the updated transaction corresponding to the target transaction data is acquired in the write cache of the merged transaction. A position or addition time of the transaction data corresponding to the write cache of the merged transaction in the execution queue is in front of the target transaction data. Whether the read cache of the parallel transaction corresponding to the target transaction data is the older transaction read cache or not can be determined according to the read cache of the updated transaction, and thus the write cache of the transaction to be merged of the target transaction data can be determined according to the read cache of the updated transaction and the write cache of the parallel transaction corresponding to the target transaction data. Therefore, on one hand, a plurality of pieces of transaction data are executed in parallel in this application, thus the efficiency of processing the transaction data by the block chain networks can be improved, the queuing of transaction data in the execution queue is reduced. On the other hand, after the plurality of pieces of transaction data are executed in parallel, the corresponding read cache of an updated transaction can be acquired according to the write cache of the merged transaction corresponding to each piece of transaction data in this application, and then whether the corresponding parallel transaction read cache is the older transaction read cache or not can be determined according to the read cache of the updated transaction corresponding to each piece of transaction data, so that the effect of verifying the read cache of the parallel transaction and the parallel transaction write cache is achieved, the correctness of the write cache of the transaction to be merged can be ensured, and the correctness of the data in the block cache can be ensured while the transaction data processing efficiency is improved.

BRIEF DESCRIPTION OF THE DRAWINGS

To describe the technical solutions in the embodiments of this application or the related art more clearly, the following briefly describes the accompanying drawings required for describing the embodiments or the related art. Apparently, the accompanying drawings in the following description show merely some embodiments of this application, and a person of ordinary skill in the art may still derive other drawings from the accompanying drawings without creative efforts.

DESCRIPTION OF EMBODIMENTS

Figure 1:
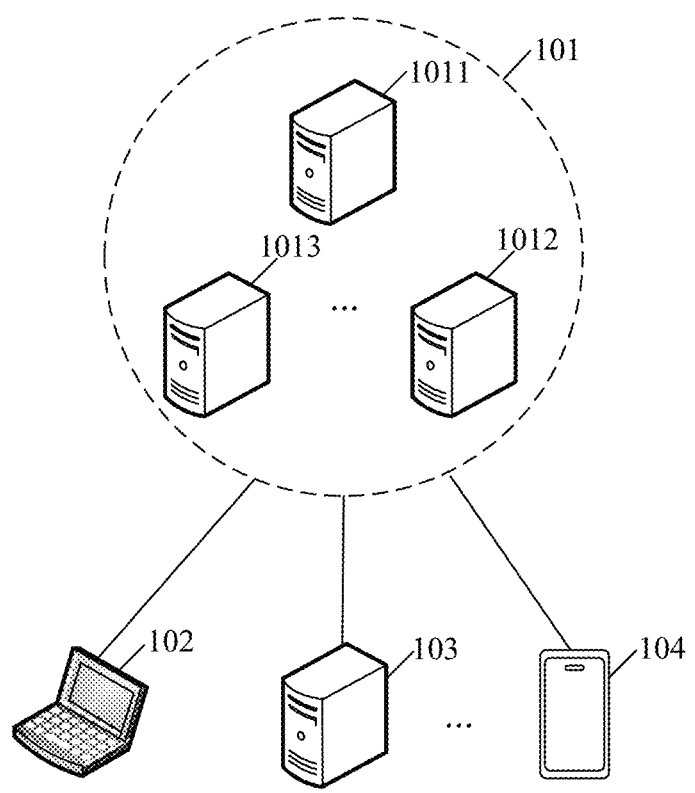
FIG. 1 is a schematic diagram of a system architecture provided by an embodiment of this application.

The technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

To make understanding easy, some nouns are simply described as follows:

1. Block chain: In terms of narrowness, the block chain is a chain type data structure taking a block as a basic unit, and a transaction history obtained previously is verified by utilizing a digital abstract in the block, so that the requirements of tamper resistance and expandability in a distributed ledger scene are met. In terms of generalization, the block chain also refers to a distributed ledger technology realized by a block chain structure, including distributed consensus, privacy and security protection, a point-to-point communication technology, a network protocol, a smart contract, etc.

The block chain aims to realize a distributed data recording ledger, and the ledger is only allowed to be added and is not allowed to be deleted. The basic structure of the bottom layer of the ledger is a linear chain table. The chain table is formed by connecting "blocks" in series. Hash values of the previous blocks are recorded in the subsequent blocks. Whether each block (and transactions in the blocks) is legal or not can be rapidly verified by a hash value computation mode. If the node in the network proposes to add a new block, consensus confirmation needs to be achieved on the block through a consensus mechanism.

2. Block: It is a data packet bearing transaction data on a block chain network and is a data structure marked with a timestamp and a hash value corresponding to the previous block. The block is verified through the consensus mechanism of the network and the transaction in the block is confirmed. The block includes a block header and a block body. The block header may be used for recording meta-information of the current block and includes data such as a current version number, a hash value corresponding to the previous block, a timestamp, a random number, and a hash value of a Merkle root. The block body may be used for recording detailed data generated in a period of time, includes all verified transaction records or other information generated in the block creation process of the current block, and can be understood as a representation form of the ledger. In addition, the detailed data of the block body can include a unique Merkle root generated through the hash process of the Merkle tree and recorded in the block header.

Previous block: It is also called a parent block. The block chain realizes time-based sorting by recording the hash value corresponding to the block and the hash value corresponding to the parent block at the block header.

3. Hash value: It is also referred to as an information characteristic value or a characteristic value. The hash value is generated by converting input data of any length into a password through a hash algorithm for fixed output. The original input data cannot be retrieved by decrypting the hash value. The hash value is a one-way encryption function. In the block chain, each block (except the initial block) contains the hash value of the previous block. The hash value is the potential core basis and the most important aspect in the block chain technology, and the hash value retains the authenticity of recording and viewing data and the integrity of the block chain as a whole.

4. Smart contract: the concept of the smart contract contains three major elements of commitment, protocol and digital form, so the application range of the block chain can be expanded to each link of transaction, payment, settlement and clearing in the financial industry. The smart contract refers to that when a pre-compiled condition is triggered, corresponding contract terms are executed immediately, and the working principle of the smart contract is similar to if-then statements of a computer program.

Referring to FIG. 1, FIG. 1 is a schematic diagram of a system architecture provided by an embodiment of this application. As shown in FIG. 1, the system architecture may include a block chain network 101, a user terminal 102, a user terminal 103, . . . , and a user terminal 104. The block chain network 101 may include a block chain node 1011, a block chain node 1012, . . . , and a block chain node 1013. It is to be understood that the above block chain network 101 may include one or more block chain nodes, and the number of the block chain nodes is not limited in this application. The above user terminal may include one or more user terminals, and the number of the user terminals is not limited in this application.

There may be a communication connection between the user terminals. For example, there is a communication connection between the user terminal 102 and the user terminal 103, and there is a communication network between the user terminal 102 and the user terminal 104.

Each block chain node (also including the block chain node 1011, the block chain node 1012 and the block chain node 1013) may receive transaction data transmitted by the user terminal when working normally. That is, there is a communication connection between the user terminal and the block chain node. For example, there is a communication connection between the block chain node 1011 and the user terminal 102, and there is a communication connection between the block chain node 1011 and the user terminal 104. The block chain node generates the block based on the received transaction data, and then the block is fed into chain. In order to ensure data intercommunication among the block chain nodes, there may be a communication connection among the block chain nodes. For example, there is a communication connection between the block chain node 1011 and the block chain node 1012, and there is a communication connection between the block chain node 1011 and the block chain node 1013.

It is to be understood that the connection mode of the communication connection is not limited. The connection may be directly or indirectly performed in a wired communication mode, or directly or indirectly performed in a wireless communication mode, or performed in other connection modes, which is not limited in this application.

The user terminal 102, the user terminal 103, . . . , the user terminal 104, the block chain node 1011, the block chain node 1012, . . . , and the block chain node 1013 in FIG. 1 may include a mobile phone, a tablet computer, a laptop, a palmtop, a smart sound box, a mobile internet device (MID), a point of sales (POS) machine, a wearable device (such as a smart watch and a smart bracelet), etc.

It is to be understood that the method for processing data based on the block chain provided by one embodiment of this application may be executed by a computer device. The computer device includes any block chain node in the above block chain network 101. The above block chain node includes, but is not limited to, a terminal or a server. The server may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a large data and AI platform. The terminal may be a sma rtphone, a tablet computer, a notebook computer, a desktop computer, a smart speaker, a smartwatch, or the like, but is not limited thereto. The terminal and the server may be directly or indirectly connected in a wired or wireless communication manner. This is not limited in this application.

In order to facilitate description, a block with block height of X is named as a block X in the full text, the block height of X is described as block height X, and X is a positive integer. For example, a block with block height of 1 is named as a block 1, and the block height of 1 is described as block height 1. A block with block height of m is named as a block m, the block height of m is described as block height m, blocks corresponding to other block heights are named as the same, and no more description is made herein.

Figure 2:
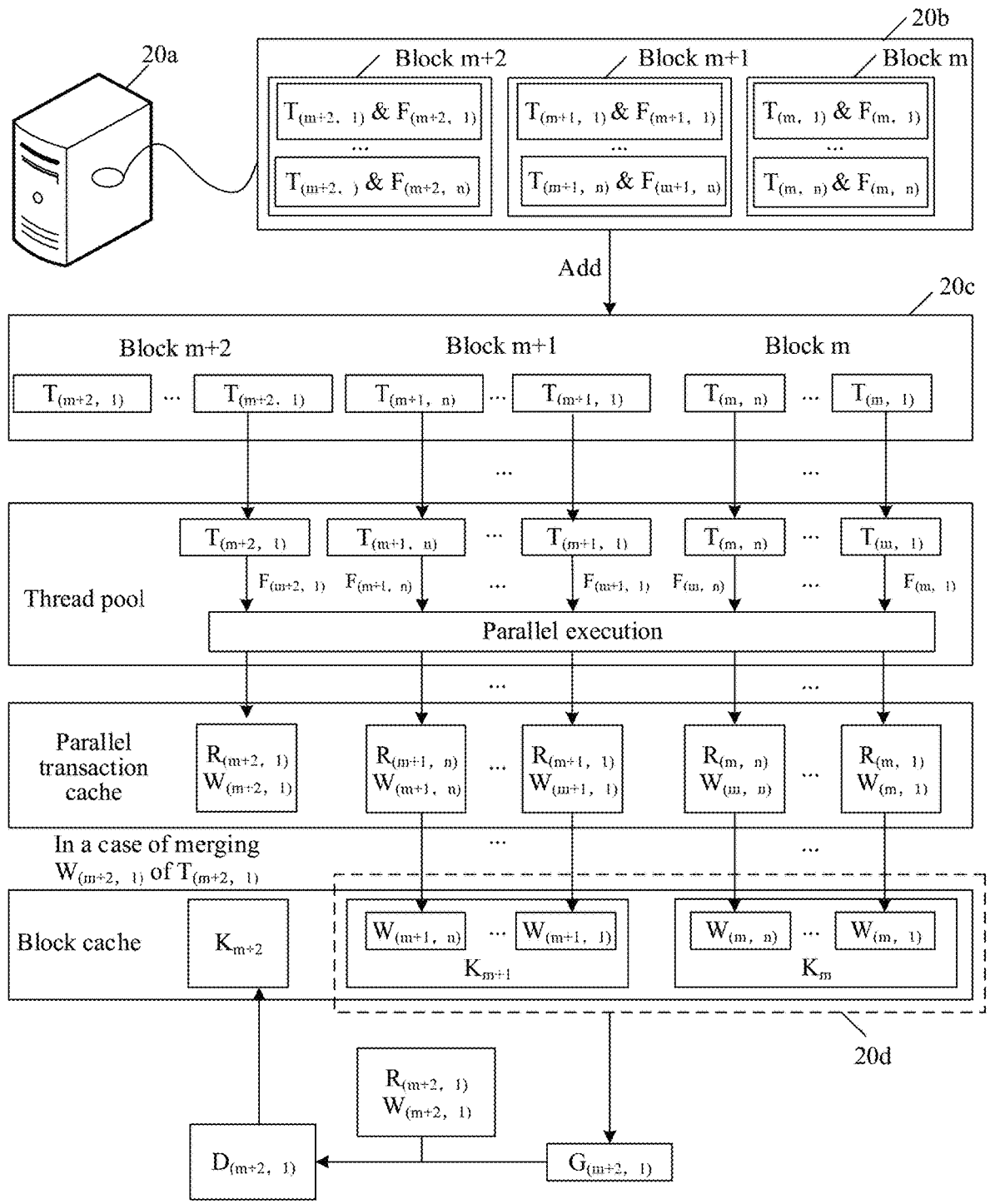
FIG. 2 is a schematic scene diagram of block chain-based data processing provided by an embodiment of this application.

Referring to FIG. 2, FIG. 2 is a schematic scene diagram of block chain-based data processing provided by an embodiment of this application. As shown in FIG. 2, a computer device 20a may be any block chain node in the block chain network 101 in FIG. 1. The computer device 20a obtains at least two blocks 20b. The at least two blocks 20b may include 3 blocks, namely a block m, a block m+1 and a block m+2. m is a positive integer greater than 1. It is to be understood that the above at least two blocks 20b may be generated by the computer device 20a serving as a block outlet node and may also be generated by other block chain nodes in the block chain network, and the generation source of the at least two blocks 20b is not limited in this application.

Referring to FIG. 2 again, the block m may include transaction data $T_{(m, 1)}$, . . . , and transaction data $T_{(m, n)}$. The block m+1 may include transaction data $T_{(m+1, 1)}$, . . . , and transaction data $T_{(m+1, n)}$. The block m+2 may include transaction data $T_{(m+2, 1)}$, . . . , and transaction data $T_{(m+2, n)}$. The a in the subscript of the transaction data $T_{(a, b)}$ represents that the transaction data belongs to the block a, and the b in the subscript represents the sequence number of the transaction data. a and b are both positive integers. a is smaller than or equal to the total block number of at least two blocks 20b, and b is smaller than or equal to the total number of the transaction data in the block a.

The at least two blocks 20b may further include contract information corresponding to transaction data besides the transaction data. As shown in FIG. 2, the block m may include contract information $F_{(m, 1)}$ corresponding to the transaction data $T_{(m, 1)}$, . . . , and contract information $F_{(m, n)}$ corresponding to the transaction data $T_{(m, n)}$. The block m+1 may include contract information $F_{(m+1, 1)}$ corresponding to the transaction data $T_{(m+1, 1)}$, . . . , and contract information $F_{(m+1, n)}$ corresponding to the transaction data $T_{(m+1, n)}$. The block m+2 may include contract information $F_{(m+2, 1)}$ corresponding to the transaction data $T_{(m+2, 1)}$, . . . , and contract information $F_{(m+2, n)}$ corresponding to the transaction data $T_{(m+2, n)}$. The a in the subscript of the contract information $F_{(a, b)}$ represents that the contract information belongs to the block a, and the b in the subscript represents the contract information sequence number. a and b are both positive integers. a is smaller than or equal to the total block number of the at least two blocks 20b, and b is smaller than or equal to the total number of contract information in the block a. The symbol "&" in FIG. 2 may represent a corresponding relationship.

Referring to FIG. 2 again, the computer device 20a adds transaction data (such as transaction data $T_{(m, 1)}$, . . . , transaction data $T_{(m, n)}$, transaction data $T_{(m+1, 1)}$, . . . , transaction data $T_{(m+1, n)}$, . . . , transaction data $T_{(m+2, 1)}$, . . . , and transaction data $T_{(m+2, n)}$) in at least two blocks 20b to an execution queue 20c according to the block height sequence and the sequence of transaction data sequence numbers, as shown in FIG. 2. In the execution queue 20c, the transaction data contained in the block m is in front of the transaction data contained in the block m+1 and the transaction data contained in the block m+2, and the transaction data $T_{(m, 1)}$ in the block m is in front of the transaction data $T_{(m, n)}$. The execution queue 20c may also be called a Transaction/Tx Queue. Subsequently, when the execution thread pool (equal to the thread pool exemplified in FIG. 2) has an idle thread, the computer device 20a puts the transaction (i.e., the transaction data) into the idle thread in sequence for parallel execution. The execution thread pool may also be called a transaction thread pool or a transaction process pool (Tx Process Pool). The execution thread pool may generate a corresponding number of transaction process threads in advance according to the pool size specified in the file configured by the computer device 20a. The transaction process threads (including idle threads) are responsible for executing contract services in the transaction in parallel.

The computer device 20a acquires at least two pieces of transaction data from the execution queue 20c in sequence according to the execution thread pool. As shown in FIG. 2, the at least two pieces of transaction data may include transaction data $T_{(m, 1)}, \ldots,$ transaction data $T_{(m, n)}$, transaction data $T_{(m+1, 1)}, \ldots,$ transaction data $T_{(m+1, n)}$ and transaction data $T_{(m+2, 1)}$. According to the contract information corresponding to each piece of transaction data, the computer device 20a executes the corresponding contract services in parallel on the transaction data $T_{(m, 1)}, \ldots,$ the transaction data $T_{(m, n)}$, the transaction data $T_{(m+1, 1)}, \ldots,$ the transaction data $T_{(m+1, n)}$ and the transaction data $T_{(m+2, 1)}$ in the execution thread pool to acquire the parallel transaction cache generated by executing the each contract service.

The parallel transaction cache may include a parallel transaction read cache and a parallel transaction write cache (also referred to as a transaction execution result of the transaction data). The read cache of the parallel transaction is used for recording a data set read by the contract service for the transaction data, such as the read cache of the parallel transaction $R_{(m, 1)}$ for the transaction data $T_{(m, 1)}, \ldots,$ the read cache of the parallel transaction $R_{(m, n)}$ for the transaction data $T_{m, n)}$, the read cache of the parallel transaction $R_{(m+1, 1)}$ for the transaction data $T_{(m+1, 1)}, \ldots,$ the read cache of the parallel transaction $R_{(m+1, n)}$ for the transaction data $T_{(m+1, n)}$, and the read cache of the parallel transaction $R_{(m+2, 1)}$ for the transaction data $T_{(m+2, 1)}$ as shown in FIG. 2.

The parallel transaction write cache is used for recording the data set modified by the contract service for the transaction data, such as the parallel transaction write cache $W_{(m, 1)}$ for the transaction data $T_{(m, 1)}, \ldots,$ the parallel transaction write cache $W_{(m, n)}$ for the transaction data $T_{(m, n)}$, the parallel transaction write cache $W_{(m+1, 1)}$ for the transaction data $T_{(m+1, 1)}, \ldots,$ the parallel transaction write cache $W_{(m+1, n)}$ for the transaction data $T_{(m+1, n)}$, and the parallel transaction write cache $W_{(m+2, 1)}$ for the transaction data $T_{(m+2, 1)}$ as shown in FIG. 2.

It is to be understood that the computer device 20a executes contract services in a plurality of blocks in parallel, such as the contract services corresponding to contract information $F_{(m, 1)}, \ldots,$ the contract services corresponding to contract information $F_{(m, n)}$, the contract services corresponding to contract information $F_{(m+1, 1)}, \ldots,$ the contract services corresponding to contract information $F_{(m+1, n)}$, and the contract services corresponding to contract information $F_{(m+2, 1)}$ as shown in FIG. 2. It is assumed that there is no intersection or mutual influence between the plurality of contract services and between the plurality of contract services and the contract services in the merged blocks, that is, the read cache of the parallel transactions read by each contract service are different data. In this situation, at least two parallel transaction write caches are write cache of the transaction to be merged corresponding to at least two pieces of transaction data respectively.

The block height of the merged block is smaller than the block height corresponding to the at least two blocks respectively. At least two blocks 20b and the merged blocks are cache blocks, namely, the blocks which are not fed into chain temporarily. The transaction (namely the transaction data) in the cache blocks are unconfirmed transactions, that is, the transaction data is in an unconfirmed state. It is to be understood that after the transaction data is broadcasted in the whole network, the block chain node will continuously select the transaction data from the transaction pool to record (generally sorting according to the transaction service charge) and record the transaction data on the blocks. The unconfirmed transactions refer to transactions which are not recorded on the block chain.

In practical application, there may be intersection between the plurality of contract services or between the plurality of contract services and the contract services in the merged blocks, that is, there is the same read data in the read cache of the parallel transactions read by the plurality of contract services. For example, the read cache of the parallel transaction $R_{(m, 1)}$ corresponding to the transaction data $T_{(m, 1)}$ is the same as the read cache of the parallel transaction $R_{(m+1, 1)}$ corresponding to the transaction data $T_{(m+1, 1)}$, namely, there is an intersection between the read cache of the parallel transaction $R_{(m, 1)}$ and the read cache of the parallel transaction $R_{(m+1, 1)}$, or it is to be understood that the read cache of the parallel transaction $R_{(m+1, 1)}$ is an older data set, so the contract services corresponding to the transaction data $T_{(m, 1)}, \ldots,$ and the contract services corresponding to the transaction data $T_{(m+1, 1)}$ are executed in parallel, and the obtained parallel transaction write cache $W_{(m+1, 1)}$ is not real-time result data.

A block cache is used for recording a data set modified when all contract services in the block are executed. When the parallel transaction write caches corresponding to the transaction data (such as transaction data $T_{(m, 1)}, \ldots,$ transaction data $T_{(m, n)}$, transaction data $T_{(m+1, 1)}, \ldots,$ transaction data $T_{(m+1, n)}$ and transaction data $T_{(m+2, 1)}$ as shown in FIG. 2) are merged to the corresponding block caches in sequence, the computer device 20a needs to verify whether parallel transaction read caches are legal transaction read data of the transaction data, namely whether the read cache of the parallel transactions (such as parallel transaction read caches $R_{(m, 1)}, \ldots,$ parallel transaction read caches $R_{(m, n)}$, parallel transaction read caches $R_{(m+1, 1)}, \ldots,$ parallel transaction read caches $R_{(m+1, n)}$ and parallel transaction read caches $R_{(m+2, 1)}$) are older transaction read data or not.

In order to make description and understanding easy, one embodiment of this application assumes the target transaction data as the transaction data $T_{(m+2, 1)}$ in FIG. 2, namely, the data state of the read cache of the parallel transaction $R_{(m+2, 1)}$ corresponding to the to-be-verified transaction data $T_{(m+2, 1)}$ in sequence, that is, whether the data is older read data or not. At the moment, as shown in FIG. 2, the parallel transaction write cache $W_{(m, 1)}, \ldots,$ and the parallel transaction write cache $W_{(m, n)}$ in the block cache $K_m$ corresponding to the block m, and the parallel transaction write cache $W_{(m+1, 1)}, \ldots,$ parallel transaction write cache $W_{(m+1, n)}$ in the block cache $K_{m+1}$ corresponding to the block m+1 are the write cache of the merged transaction 20d of the transaction data $T_{(m+2, 1)}$.

Referring to FIG. 2, the computer device 20a acquires the read cache of the updated transaction $G_{(m+2, 1)}$ corresponding to the target transaction data (namely the transaction data $T_{(m+2, 1)}$) from the write cache of the merged transaction 20d. Reference is made to S103 in a corresponding embodiment in FIG. 3 below for the specific process of acquiring the read cache of the updated transaction $G_{(m+2, 1)}$, and no more description is made herein.

The computer device 20a verifies the read cache of the parallel transaction (namely parallel transaction read cache $R_{(m+2, 1)}$) corresponding to the target transaction data according to the read cache of the updated transaction $G_{(m+2, 1)}$ to obtain a verification result. If the verification result indicates that there is no read data conflict between the read cache of the parallel transaction $R_{(m+2, 1)}$ and the read cache of the updated transaction $G_{(m+2, 1)}$, it may be determined that the parallel transaction write cache $W_{(m+2, 1)}$ is a write cache of the transaction to be merged $D_{(m+2, 1)}$ of the transaction data $T_{(m+2, 1)}$. If the verification result indicates that there is a read data conflict between the read cache of the parallel transaction $R_{(m+2, 1)}$ and the read cache of the updated transaction $G_{(m+2, 1)}$, the transaction execution service of the transaction data $T_{(m+2, 1)}$ according to the read cache of the updated transaction $G_{(m+2, 1)}$ and the transaction data $T_{(m+2, 1)}$ to obtain a transaction execution result of the transaction data $T_{(m+2, 1)}$, and the write cache of the transaction to be merged $D_{(m+2, 1)}$ is generated according to the transaction execution result.

Referring to FIG. 2 again, the computer device 20a merges the write cache of the transaction to be merged $D_{(m+2, 1)}$ into the block cache (namely the block cache $K_{m+2}$ in FIG. 2) to which the target transaction data belongs. The write cache of the transaction to be merged of the next transaction data (such as the transaction data $T_{(m+2, 2)}$) of the block m+2 is continuously merged. The specific merging process is consistent with the merging process of the write cache of the transaction to be merged $D_{(m+2, 1)}$ of the transaction data $T_{(m+2, 1)}$.

Therefore, this application can provide a solution for parallel execution of a plurality of blocks and a plurality of smart contracts, and as a result, the performance of the block chain network and the throughput of the transaction data are greatly improved.

Figure 3:
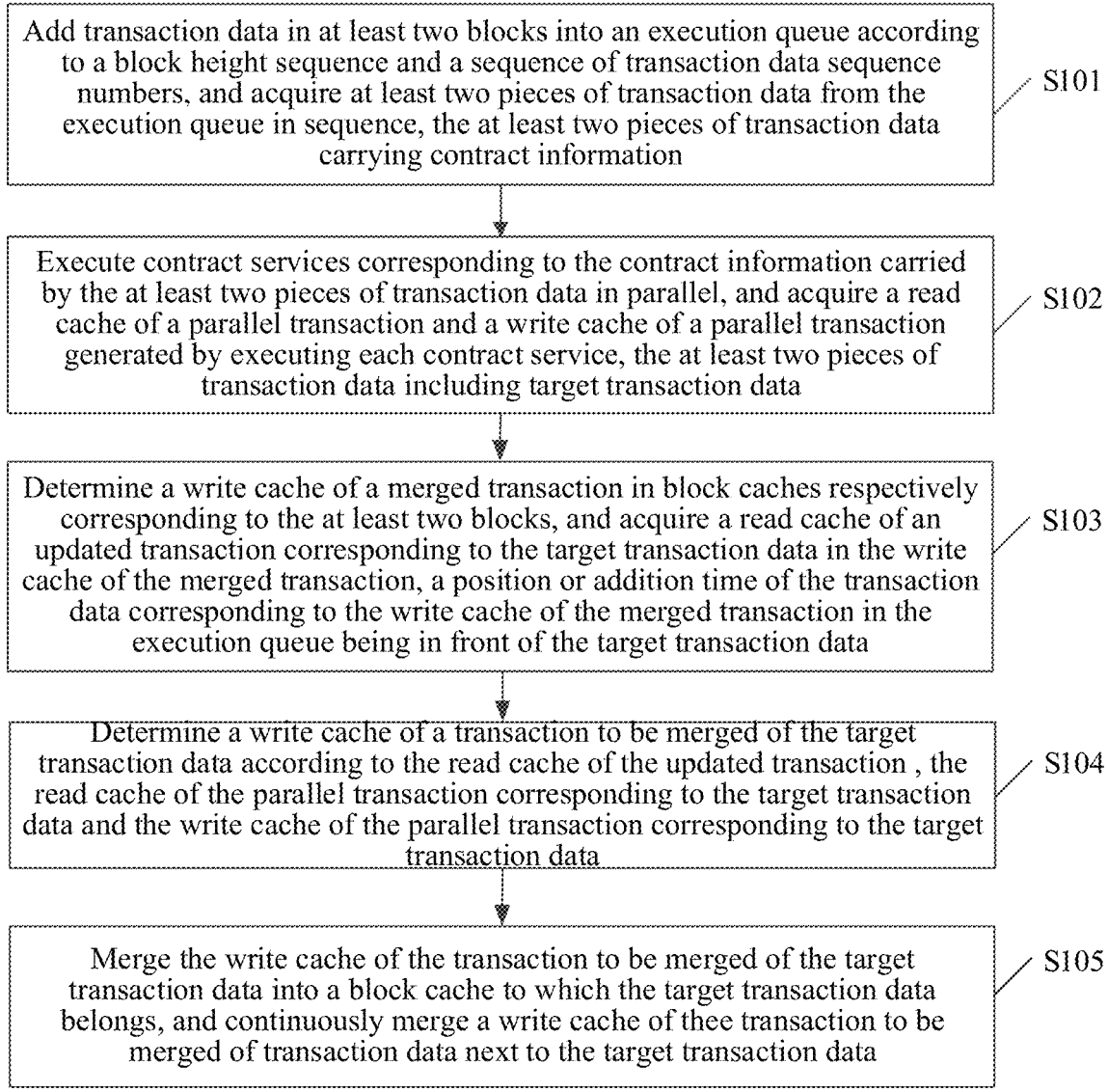
FIG. 3 is a schematic flowchart of a method for processing data based on a block chain provided by an embodiment of this application.

Referring to FIG. 3, FIG. 3 is a schematic flowchart of a method for processing data based on a block chain provided by an embodiment of this application. The method for processing data may be executed by the computer device described in FIG. 1. As shown in FIG. 3, the data processing process may include the following steps.

S101: Add transaction data in at least two blocks into an execution queue according to a block height sequence and a sequence of transaction data sequence numbers, and acquire at least two pieces of transaction data from the execution queue in sequence, the at least two pieces of transaction data carrying contract information.

In one embodiment, a mode of acquiring at least two pieces of transaction data from the execution queue in sequence includes: determining an idle number corresponding to idle threads in a parallel execution thread pool; and acquiring the at least two pieces of transaction data from the execution queue in sequence through the idle threads when the idle number is equal to or greater than a parallel execution thread threshold, a transaction number of the at least two pieces of transaction data being equal to the idle number.

Reference may be made to the description of the corresponding embodiment in FIG. 2 for the specific implementation process of adding transaction data in at least two blocks into the execution queue according to the block height sequence and the sequence of transaction data sequence numbers, no more description is made here.

In one embodiment, at least two pieces of transaction data are from different blocks, so the parallel execution of a plurality of pieces of transaction data from a plurality of blocks can be realized, and the efficiency of processing the transaction data by the block chain network is further improved.

One transaction in the block chain is a digital record. In one embodiment of this application, one transaction is referred to as one piece of transaction data. The transaction data is broadcast in the whole network range through the block chain network, and confirmation and verification are carried out on the transaction data in the whole network through a consensus mechanism, so that the transaction is irreversible and is prevented from being tampered.

The transactions in the block chain network may be divided into confirmed transactions and unconfirmed transactions. The confirmed transactions indicate that the transactions are recorded and confirmed by the block chain network. For example, when a transaction 1 occurs, the block recording the transaction 1 will confirm for the first time, and each block after this block will confirm again. When the number of confirmations reaches six or more, it is usually considered that this transaction is relatively safe and difficult to tamper, and the transaction 1 can be determined as a confirmed transaction.

The unconfirmed transactions refer to transactions which are not recorded on the block chain, namely, the transaction data is in an unconfirmed state. It is to be understood that after the transaction data is broadcasted in the whole network, the block chain node will continuously select the transaction data from the transaction pool to record the transaction data to generate a block, but the block is not fed into chain yet. In this application, at least two blocks and blocks in a cache database proposed in the following text are all cache blocks, namely, blocks which are not fed into chain yet.

Figure 4:
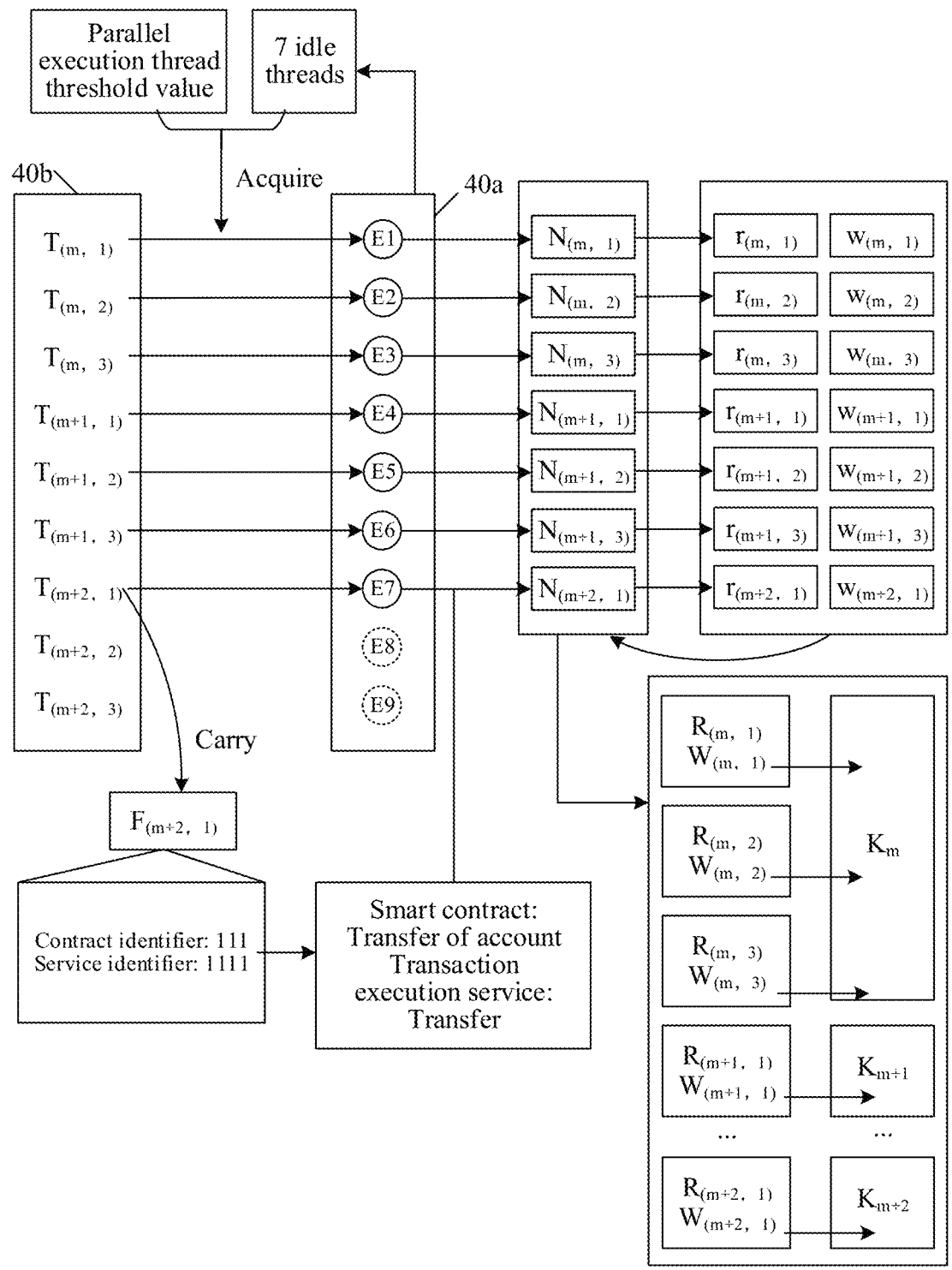
FIG. 4 is a schematic scene diagram of block chain-based data processing provided by an embodiment of this application.

Further referring to FIG. 4, FIG. 4 is a schematic scene diagram of block chain-based data processing provided by an embodiment of this application. As shown in FIG. 4, at least two blocks may include 3 blocks, namely a block m, a block m+1 and a block m+2. The block m may include transaction data $T_{(m, 1)}$, transaction data $T_{(m, 2)}$ and transaction data $T_{(m, 3)}$. The block m+1 may include transaction data $T_{(m+1, 1)}$, transaction data $T_{(m+1, 2)}$ and transaction data $T_{(m+1, 3)}$. The block m+2 may include transaction data $T_{(m+2, 1)}$, transaction data $T_{(m+2, 2)}$ and transaction data $T_{(m+2, 3)}$. Therefore, the execution queue 40b may include the 9 pieces of transaction data which are arranged according to the block height sequence and the sequence of the transaction data sequence numbers.

The a in the subscript of the transaction data $T_{(a, b)}$ represents that the transaction data belongs to the block a, and the b in the subscript represents the sequence number of the transaction data. a and b are both positive integers. a is smaller than or equal to the total block number of at least two blocks 40b, and b is smaller than or equal to the total number of the transaction data in the block a.

In addition, the block m may include contract information carried by the transaction data $T_{(m, 1)}$, the transaction data $T_{(m, 2)}$ and the transaction data $T_{(m, 3)}$. The block m+1 may include contract information carried by the transaction data $T_{(m+1, 1)}$, the transaction data $T_{(m+1, 2)}$ and the transaction data $T_{(m+1, 3)}$. The block m+2 may include contract information carried by the transaction data $T_{(m+2, 1)}$, the transaction data $T_{(m+2, 2)}$ and the transaction data $T_{(m+2, 3)}$, such as contract information $F_{(m+2, 1)}$ carried by the transaction data $T_{(m+2, 1)}$ as shown in FIG. 4.

The block cache is constructed for each block in the execution queue 40b, and reference may also be made to the block cache as shown in FIG. 2.

The parallel execution thread pool 40a may include an idle thread E1, an idle thread E2, an idle thread E3, an idle thread E4, an idle thread E5, an idle thread E6, an idle thread E7, a busy thread E8 and a busy thread E9. The idle thread may represent that the thread is in an idle state, and the busy thread may represent that the thread is in a working state.

Referring to FIG. 4 again, the computer device firstly determines the idle number corresponding to the idle threads in the parallel execution thread pool 40a. According to the idle thread E1, the idle thread E2, the idle thread E3, the idle thread E4, the idle thread E5, the idle thread E6, the idle thread E7, the busy thread E8 and the busy thread E9, it may be known that the parallel execution thread pool 40a currently has 7 idle threads, so the idle number is 7. The idle number 7 is compared with a parallel execution thread threshold. The parallel execution thread threshold may be configured according to hardware conditions. For example, the parallel execution thread threshold is equal to one half or two thirds of the total thread in the parallel execution thread pool 40a. The relationship between the parallel execution thread threshold and the total thread in the parallel execution thread pool 40a is not limited in this application, and it may be set according to a specific application scene or other conditions.

If the parallel execution thread threshold is set to be 8, the idle number is smaller than the parallel execution thread threshold. At the moment, the computer device does not need to acquire the transaction data from the execution queue 40b in sequence, or may acquire at least two pieces of transaction data with the same idle number from the execution queue 40b in sequence, for example, transaction data $T_{(m, 1)}$, transaction data $T_{(m, 2)}$, transaction data $T_{(m, 3)}$, transaction data $T_{(m+1, 1)}$, transaction data $T_{(m+1, 2)}$, transaction data $T_{(m+1, 3)}$ and transaction data $T_{(m+2, 1)}$, but S102 is not executed at the moment. When the idle number is equal to or larger than 8, transaction data $T_{(m+2, 2)}$ and the like are acquired from the execution queue 40b in sequence through a newly added idle thread, and then S102 is executed.

If the parallel execution thread threshold is set to be 6, the idle number is greater than the parallel execution thread threshold. At the moment, the computer device may acquire 7 pieces of transaction data from the execution queue 40b in sequence through 7 idle threads, for example, transaction data $T_{(m, 1)}$, transaction data $T_{(m, 2)}$, transaction data $T_{(m, 3)}$, transaction data $T_{(m+1, 1)}$, transaction data $T_{(m+1, 2)}$, transaction data $T_{(m+1, 3)}$ and transaction data $T_{(m+2, 1)}$, as shown in FIG. 4. The transaction data $T_{(m, 1)}$ is added to the idle thread E1. The transaction data $T_{(m, 2)}$ is added to the idle thread E2. The transaction data $T_{(m, 3)}$ is added to the idle thread E3. The transaction data $T_{(m+1, 1)}$ is added to the idle thread E4. The transaction data $T_{(m+1, 2)}$ is added to the idle thread E5. The transaction data $T_{(m+1, 3)}$ is added to the idle thread E6. The transaction data $T_{(m+2, 1)}$ is added to the idle thread E7.

S102: Execute contract services corresponding to the contract information carried by the at least two pieces of transaction data in parallel, and acquire a parallel transaction read cache and a parallel transaction write cache generated by executing each contract service, the at least two pieces of transaction data including target transaction data.

In some possible implementations, the at least two contract services include at least two smart contracts and at least two transaction execution services. The smart contracts used for executing the at least two pieces of transaction data are determined according to contract identifiers included in the at least two pieces of contract information respectively. Transaction execution services called by the at least two smart contracts respectively for executing the at least two pieces of transaction data are determined according to the service identifiers included in the at least two pieces of contract information respectively. The at least two transaction execution services are executed in parallel, and a parallel transaction read cache and a parallel transaction write cache generated by executing each transaction execution service are acquired.

The specific process of acquiring the parallel transaction caches (including the read cache of the parallel transaction and the parallel transaction write cache) corresponding to the at least two pieces of transaction data respectively may include: creating an initial transaction read cache and an initial transaction write cache respectively for the at least two pieces of transaction data according to the at least two transaction execution services; executing the at least two transaction execution services in parallel, and acquiring parallel transaction read data and parallel transaction write data generated by executing each transaction execution service; storing each piece of parallel transaction read data into the corresponding initial transaction read cache to obtain parallel transaction read caches corresponding to the at least two pieces of transaction data respectively; and storing each piece of parallel transaction write data into the corresponding initial transaction write cache to obtain parallel transaction write caches corresponding to the at least two pieces of transaction data respectively.

As shown in S101, it can be learnt that each piece of transaction data carries its corresponding contract information, such as contract information $F_{(m+2, 1)}$ carried by the transaction data $T_{(m+2, 1)}$ in the block m+2 shown in FIG. 4. The contract information $F_{(m+2, 1)}$ includes the contract identifier. For example, the contract identifier 111 shown in FIG. 4 is a transfer contract identifier. The computer device may determine a smart contract for executing the transaction data $T_{(m+2, 1)}$ as a transfer contract according to the contract identifier 111. The contract information $F_{(m+2, 1)}$ may include a service identifier. For example, the service identifier 1111 shown in FIG. 4 is a transfer contract identifier. The computer device may determine a transaction execution service which is called by the transfer contract for executing the transaction data $T_{(m+2, 1)}$ as a transaction transfer service according to the service identifier 1111.

Similarly, the computer device may determine a smart contract for executing the transaction data and a transaction execution service called by the smart contract according to contract information carried by other transaction data (including transaction data $T_{(m, 1)}$, transaction data $T_{(m, 2)}$, transaction data $T_{(m, 3)}$, transaction data $T_{(m+1, 1)}$, transaction data $T_{(m+1, 2)}$ and transaction data $T_{(m+1, 3)}$).

The computer device creates the cache of the initial transactions for the at least two pieces of transaction data in the block cache to which each transaction data belongs according to at least two transaction execution services. The cache of the initial transactions include an initial transaction read cache and an initial transaction write cache. The initial transaction read cache and the initial transaction write cache corresponding to each piece of transaction data are empty sets before the contract services corresponding to the at least two pieces of transaction data are not executed in parallel. Due to the fact that the data is not read or modified, the initial transaction read cache and the initial transaction write cache are not drawn in FIG. 4 respectively, and the cache of the initial transaction is used for representing the initial transaction read cache and the initial transaction write cache.

As shown in FIG. 4, the cache of the initial transaction may include an cache of the initial transaction $N_{(m, 1)}$ corresponding to the transaction data $T_{(m, 1)}$, an cache of the initial transaction $N_{(m, 2)}$ corresponding to the transaction data $T_{(m, 2)}$, an cache of the initial transaction $N_{(m, 3)}$ corresponding to the transaction data $T_{(m, 3)}$, an cache of the initial transaction $N_{(m+1, 1)}$ corresponding to the transaction data $T_{(m+1, 1)}$, an cache of the initial transaction $N_{(m+1, 2)}$ corresponding to the transaction data $T_{(m+1, 2)}$, an cache of the initial transaction $N_{(m+1, 3)}$ corresponding to the transaction data $T_{(m+1, 3)}$, and an cache of the initial transaction $N_{(m+2, 1)}$ corresponding to the transaction data $T_{(m+2, 1)}$. It is to be understood that the cache of the initial transaction $N_{(m, 1)}$, the cache of the initial transaction $N_{(m, 2)}$, the cache of the initial transaction $N_{(m, 3)}$, the cache of the initial transaction $N_{(m+1, 1)}$, the cache of the initial transaction $N_{(m+1, 2)}$, the cache of the initial transaction $N_{(m+1, 3)}$ and the cache of the initial transaction $N_{(m+2, 1)}$ are all empty sets.

Referring to FIG. 4 again, the computer device executes the transaction execution services corresponding to transaction data $T_{(m, 1)}$, the transaction execution services corresponding to transaction data $T(m, 2)$, the transaction execution services corresponding to transaction data $T_{(m, 3)}$, the transaction execution services corresponding to transaction data $T_{(m+1, 1)}$, the transaction execution services corresponding to transaction data $T_{(m+1, 2)}$, the transaction execution services corresponding to transaction data $T_{(m+1, 3)}$ and the transaction execution services corresponding to transaction data $T_{(m+2, 1)}$ in parallel according to the idle thread E1, the idle thread E2, the idle thread E3, the idle thread E4, the idle thread E5, the idle thread E6 and the idle thread E7.

The computer device acquires the parallel transaction read data and the parallel transaction write data generated by executing each transaction execution service. As shown in FIG. 4, the parallel transaction read data may include parallel transaction read data $r_{(m, 1)}$ corresponding to the transaction data $T_{(m, 1)}$, parallel transaction read data $r_{(m, 2)}$ corresponding to the transaction data $T_{(m, 2)}$, parallel transaction read data $r_{(m, 3)}$ corresponding to the transaction data $T_{(m, 3)}$, parallel transaction read data $r_{(m+1, 1)}$ corresponding to the transaction data $T_{(m+1, 1)}$, parallel transaction read data $r_{(m+1, 2)}$ corresponding to the transaction data $T_{(m+1, 2)}$, parallel transaction read data $r_{(m+1, 3)}$ corresponding to the transaction data $T_{(m+1, 3)}$, and parallel transaction read data $r_{(m+2, 1)}$ corresponding to the transaction data $T_{(m+2, 1)}$.

The parallel transaction write data may include parallel transaction write data $w_{(m, 1)}$ corresponding to the transaction data $T_{(m, 1)}$, parallel transaction write data $w_{(m, 2)}$ corresponding to the transaction data $T_{(m, 2)}$, parallel transaction write data $w_{(m, 3)}$ corresponding to the transaction data $T_{(m, 3)}$, parallel transaction write data $w_{(m+1, 1)}$ corresponding to the transaction data $T_{(m+1, 1)}$, parallel transaction write data $w_{(m+1, 2)}$ corresponding to the transaction data $T_{(m+1, 2)}$, parallel transaction write data $w_{(m+1, 3)}$ corresponding to the transaction data $T_{(m+1, 3)}$, and parallel transaction write data $w_{(m+2, 1)}$ corresponding to the transaction data $T_{(m+2, 1)}$.

The computer device stores each piece of parallel transaction read data into the corresponding initial transaction read cache to obtain parallel transaction read caches corresponding to the at least two pieces of transaction data respectively. As shown in FIG. 4, parallel transaction read data $r_{(m, 1)}$ is stored to an cache of the initial transaction $N_{(m, 1)}$ (including the initial transaction read cache) corresponding to the transaction data $T_{(m, 1)}$ to obtain a parallel transaction read cache $R_{(m, 1)}$ corresponding to the transaction data $T_{(m, 1)}$. The computer device stores the parallel transaction read data $r_{(m, 2)}$ to an cache of the initial transaction $N_{(m, 2)}$ (including an initial transaction read cache) corresponding to the transaction data $T_{(m, 2)}$ to obtain a parallel transaction read cache $R_{(m, 2)}$ corresponding to the transaction data $T_{(m, 2)}$, and stores the parallel transaction read data $r_{(m, 3)}$ to an cache of the initial transaction $N_{(m, 3)}$ (including an initial transaction read cache) corresponding to the transaction data $T_{(m, 3)}$ to obtain a parallel transaction read cache $R_{(m, 3)}$ corresponding to the transaction data $T_{(m, 3)}$. The computer device stores the parallel transaction read data $r_{(m+1, 1)}$ to an cache of the initial transaction $N_{(m+1, 1)}$ (including an initial transaction read cache) corresponding to the transaction data $T_{(m+1, 1)}$ to obtain a parallel transaction read cache $R_{(m+1, 1)}$ corresponding to the transaction data $T_{(m+1, 1)}$; . . . ; the computer device stores the parallel transaction read data $r_{(m+2, 1)}$ to an cache of the initial transaction $N_{(m+2, 1)}$ (including an initial transaction read cache) corresponding to the transaction data $T_{(m+2, 1)}$ to obtain a parallel transaction read cache $R_{(m+2, 1)}$ corresponding to the transaction data $T_{(m+2, 1)}$.

The computer device stores each piece of parallel transaction write data into the corresponding initial transaction write cache to obtain parallel transaction write caches corresponding to the at least two pieces of transaction data respectively. As shown in FIG. 4, parallel transaction write data $w_{(m, 1)}$ is stored to an cache of the initial transaction $N_{(m, 1)}$ (including an initial transaction write cache) corresponding to transaction data $T_{(m, 1)}$ to obtain a parallel transaction write cache $W_{(m, 1)}$ corresponding to the transaction data $T_{(m, 1)}$. The computer device stores the parallel transaction read data $w_{(m, 2)}$ to an cache of the initial transaction $N_{(m, 2)}$ (including an initial transaction write cache) corresponding to the transaction data $T_{(m, 2)}$ to obtain a parallel transaction write cache $W_{(m, 2)}$ corresponding to the transaction data $T_{(m, 2)}$, and stores the parallel transaction write data $w_{(m, 3)}$ to an cache of the initial transaction $N_{(m, 3)}$ (including an initial transaction write cache) corresponding to the transaction data $T_{(m, 3)}$ to obtain a parallel transaction write cache $W_{(m, 3)}$ corresponding to the transaction data $T_{(m, 3)}$. The computer device stores the parallel transaction write data $w_{(m+1, 1)}$ to an cache of the initial transaction $N_{(m+1, 1)}$ (including an initial transaction write cache) corresponding to the transaction data $T_{(m+1, 1)}$ to obtain a parallel transaction write cache $W_{(m+1, 1)}$ corresponding to the transaction data $T_{(m+1, 1)}$; . . . ; the computer device stores the parallel transaction write data $w_{(m+2, 1)}$ to an cache of the initial transaction $N_{(m+2, 1)}$ (including an initial transaction write cache) corresponding to the transaction data $T_{(m+2, 1)}$ to obtain a parallel transaction write cache $W_{(m+2, 1)}$ corresponding to the transaction data $T_{(m+2, 1)}$.

If there is no conflict, namely, there is no intersection, between the parallel execution transaction read data corresponding to the at least two pieces of transaction data, as shown in FIG. 4, the parallel execution transaction write data corresponding to the at least two pieces of transaction data may be merged into corresponding block caches (block caches $K_{m+2}$, $K_{m+1}$ and $K_m$ shown in FIG. 4). However, in practical application, there may be a conflict between the at least two pieces of parallel execution transaction read data, so the at least two pieces of parallel execution transaction write data cannot be directly merged into the corresponding block caches, the read data conflict verification needs to be performed on the at least two pieces of parallel execution transaction read data in sequence, and then whether parallel execution write caches may be merged into the block caches or not is determined according to the verification result. The merging opportunity of each parallel execution transaction write cache is that all previous transactions (including transaction data in the previous block and previous transactions of this block) are merged, and for the specific process, reference is made to S103-S105.

S103: Determine a merged transaction write cache in block caches respectively corresponding to the at least two blocks, and acquire an read cache of an updated transaction corresponding to the target transaction data in the write cache of the merged transaction, a position or addition time of the transaction data corresponding to the write cache of the merged transaction in the execution queue being in front of the target transaction data.

In one embodiment, the mode of determining the write cache of the merged transaction in the block caches respectively corresponding to the at least two blocks may include: acquiring a target block to which target transaction data belongs, and determining the target block height of the target block; determining merged transaction data in the target block according to the sequence of the transaction data sequence numbers, the transaction data sequence number corresponding to the merged transaction data being smaller than the transaction data sequence number corresponding to the target transaction data; determining the merged block from the at least two blocks according to the target block height, a block height corresponding to the merged block being smaller than the target block height; and determining the transaction write cache in the block cache corresponding to the merged block and the transaction write cache corresponding to the merged transaction data as the write cache of the merged transaction.

For example, the mode can include: sequentially traversing the write cache of the merged transactions according to a block height sequence from high to low and a sequence of transaction data sequence numbers from large to small until acquiring the write cache of the merged transaction to be read for the target transaction data; and generating the read cache of the updated transaction according to the write cache of the merged transaction to be read for the target transaction data.

Figure 5:
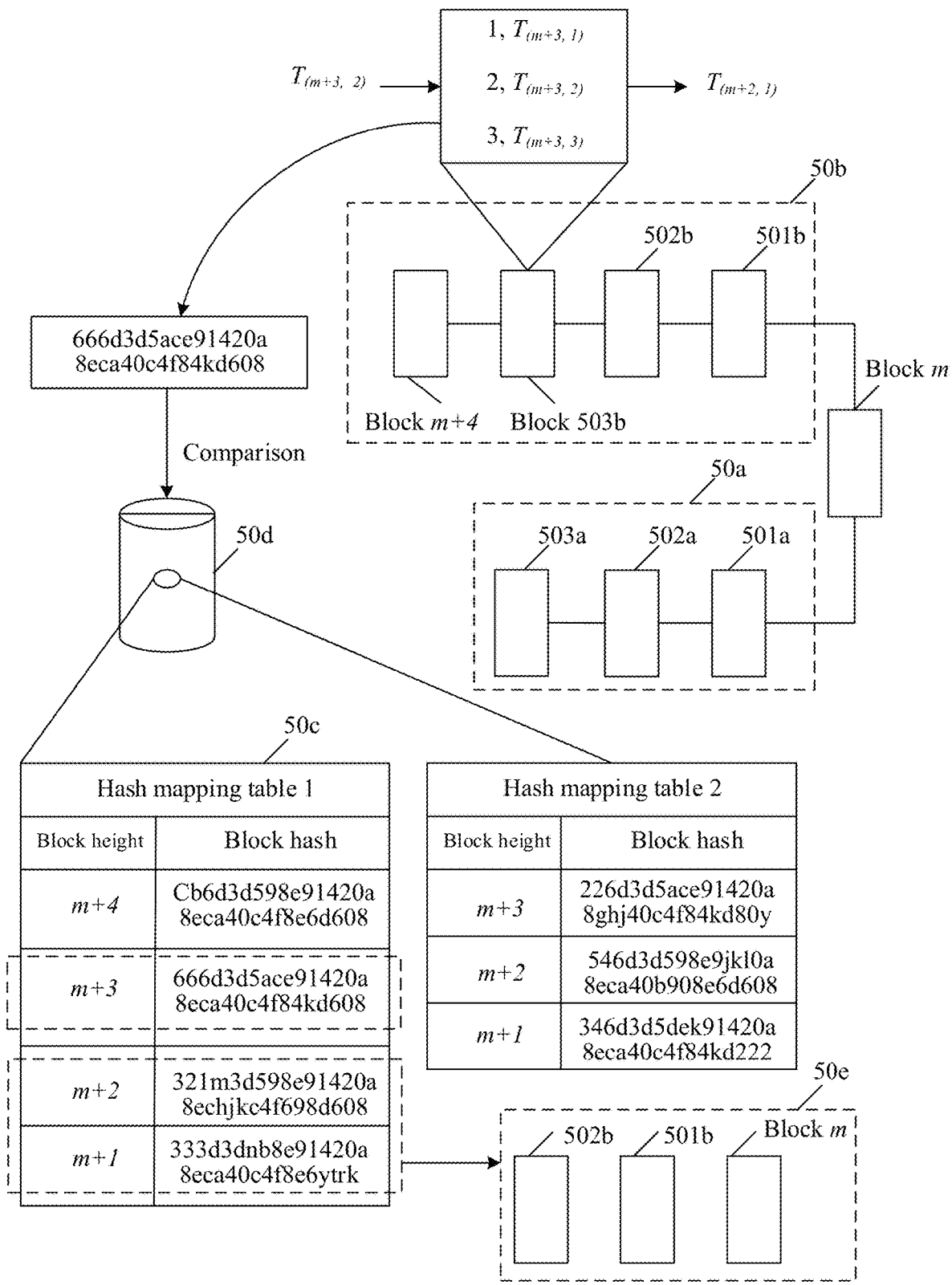
FIG. 5 is a schematic scene diagram of block chain-based data processing provided by an embodiment of this application.

Further referring to FIG. 5, FIG. 5 is a schematic scene diagram of block chain-based data processing provided by an embodiment of this application. In order to make understanding and description easy, the block m is set as a first block in a cache database 50d, that is, the block height corresponding to other blocks in the cache database 50d is greater than or equal to the block height corresponding to the block m. The blocks in the cache database 50d are all cache blocks, that is, blocks which are not fed into chain. The blocks of which the block height is greater than the block height corresponding to the block m are all blocks fed into chain, that is, blocks which are fed into chain.

As shown in FIG. 5, the computer device acquires a target block to which the target transaction data $T_{(m+3,\ 2)}$ belongs. Obviously, the target transaction data $T_{(m+3,\ 2)}$ is the $2^{nd}$ transaction data in the block 503b, so that the target block to which the target transaction data $T_{(m+3,\ 2)}$ belongs is the block 503b, and the block height of the block 503b is m+3. The block 503b may include transaction data $T_{(m+3,\ 1)}$, target transaction data $T_{(m+3,\ 2)}$ and transaction data $T_{(m+3,\ 3)}$. The computer device may determine that the transaction data $T_{(m+3,\ 1)}$ in the target block (namely the block 503b) is merged transaction data according to the sequence of transaction data sequence numbers.

At least two blocks described in S103 do not belong to a fork block chain, namely, the block chain network only has one main chain. At the moment, the merged block may be determined according to the target block height corresponding to the target block, and the block height corresponding to the merged block is smaller than the target block height. The computer device determines the transaction write cache in the block cache corresponding to the merged block and the transaction write cache corresponding to the merged transaction data as the write cache of the merged transaction.

In one embodiment, at least two blocks belong to the fork block chain. For the situation, reference is made to the corresponding embodiment in FIG. 8, and no more description is made herein.

Figure 6:
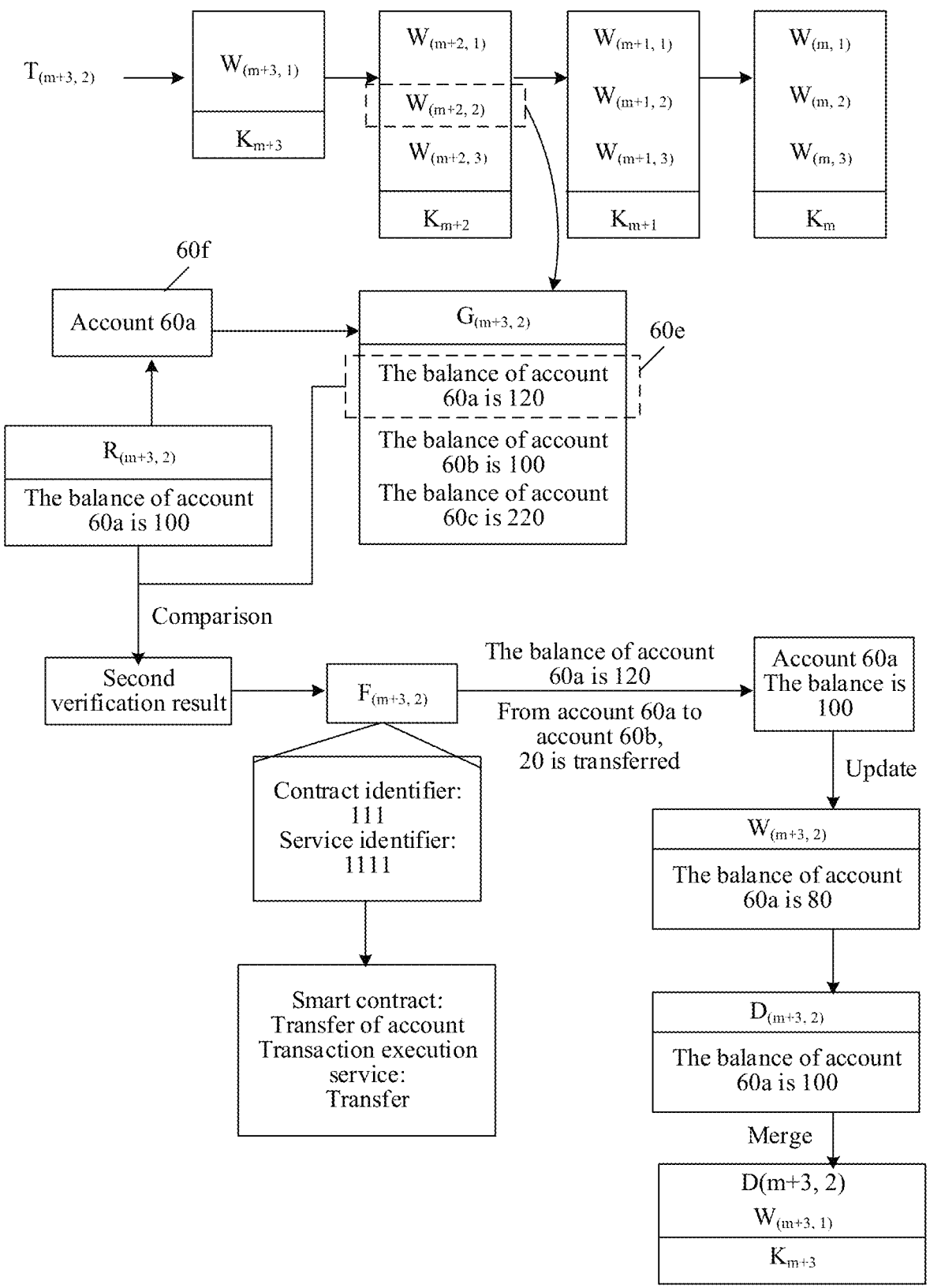
FIG. 6 is a schematic scene diagram of block chain-based data processing provided by an embodiment of this application.

Further referring to FIG. 6, FIG. 6 is a schematic scene diagram of block chain-based data processing provided by an embodiment of this application. The computer device sequentially traverses the write cache of the merged transactions according to the block height sequence from high to low and the sequence of the transaction data sequence numbers from large to small. The write cache of the merged transaction may include a transaction write cache $W_{(m+2,\ 1)}$, a transaction write cache $W_{(m+2,\ 2)}$ and a transaction write cache $W_{(m+2,\ 3)}$ in the block cache $K_{m+2}$, a transaction write cache $W_{(m+1,\ 1)}$, a transaction write cache $W_{(m+1,\ 2)}$ and a transaction write cache $W_{(m+1,\ 3)}$ in the block cache $K_{m+1}$, a transaction write cache $W_{(m,\ 1)}$, a transaction write cache $W_{(m,\ 2)}$ and a transaction write cache $W_{(m,\ 3)}$ in the block cache $K_m$, and a transaction write cache $W_{(m+3,\ 1)}$ in the block cache $K_{m+3}$.

Therefore, the computer device traverses the transaction write cache $W_{(m+3,\ 1)}$ firstly, and determines the transaction write cache $W_{(m+3,\ 1)}$ as the write cache of the updated transaction if there is data to be read by target transaction data $T_{(m+3,\ 2)}$ in the transaction write cache $W_{(m+3,\ 1)}$. The computer device transverses the transaction write cache $W_{(m+2,\ 3)}$ if there is no data to be read by the target transaction data $T_{(m+3,\ 2)}$ in the transaction write cache $W_{(m+3,\ 1)}$. Similarly, the computer device determines the transaction write cache $W_{(m+2,\ 3)}$ as the write cache of the updated transaction if there is data to be read by the target transaction data $T_{(m+3,\ 2)}$ in the transaction write cache $W_{(m+2,\ 3)}$. The computer device traverses the write cache of the next transaction if there is no data to be read by the target transaction data $T_{(m+3,\ 2)}$ in the write cache of the transaction $W_{(m+2,\ 3)}$ until the write cache of the merged transaction to be read by the target transaction data $T_{(m+3,\ 2)}$ is obtained. The computer device generates the read cache of the updated transaction according to the write cache of the merged transaction to be read by the target transaction data. As shown in FIG. 6, the write cache of the transaction $W_{(m+2,\ 2)}$ is an updated transaction write cache $G_{(m+3,\ 2)}$.

S104: Determine a write cache of the transaction to be merged of the target transaction data according to the read cache of the updated transaction, the read cache of the parallel transaction corresponding to the target transaction data and the write cache of the parallel transaction corresponding to the target transaction data.

In one embodiment, S104 includes: performing read data conflict verification on the read cache of the parallel transaction corresponding to the target transaction data and the read cache of the updated transaction to obtain a verification result; and then determining the write cache of the transaction to be merged of the target transaction data according to the verification result and the parallel transaction write cache corresponding to the target transaction data.

One embodiment of performing read data conflict verification on the read cache of the parallel transaction corresponding to the target transaction data and the read cache of the updated transaction to obtain a verification result includes: determining the parallel transaction read data in the read cache of the parallel transaction corresponding to the target transaction data as target parallel transaction read data; determining a target object of the target parallel transaction read data, and acquiring updated transaction read data associated with the target object in the read cache of the updated transaction; and performing read data conflict verification on the target parallel transaction read data and the updated transaction read data to obtain the verification result.

The verification result includes a first verification result and a second verification result. The specific process of obtaining the verification result may include: comparing the target parallel transaction read data with the updated transaction read data; determining the verification result as the first verification result when the target parallel transaction read data is the same as the updated transaction read data, the first verification result being used for indicating that there is no read data conflict between the target parallel transaction read data and the updated transaction read data; and determining the verification result as the second verification result when the target parallel transaction read data is different from the updated transaction read data, the second verification result being used for indicating that a read data conflict exists between the target parallel transaction read data and the updated transaction read data.

The specific process of determining the write cache of the transaction to be merged of the target transaction data may include: determining the parallel transaction write cache corresponding to target transaction data as the write cache of the transaction to be merged of the target transaction data when the first verification result is the first verification result; and generating the write cache of the transaction to be merged of the target transaction data according to the updated transaction read data and contract information carried by the target transaction data when the verification result is the second verification result.

The specific process of generating the write cache of the transaction to be merged of the target transaction data may include: determining a target smart contract used for executing the target transaction data according to the contract identifiers in the contract information carried by the target transaction data; determining a target transaction execution service called by the target smart contract for executing the target transaction data according to the service identifiers in the contract information carried by the target transaction data; executing the target transaction execution service according to the updated transaction read data and the target transaction data, and acquiring a target transaction execution result corresponding to the target transaction data; and updating the parallel transaction write cache corresponding to the target transaction data according to the target transaction execution result to obtain the write cache of the transaction to be merged of the target transaction data.

Referring to FIG. 6 again, and in combination with S103, the write cache of the updated transaction $G_{(m+3,\ 2)}$ of the target transaction data $T_{(m+3,\ 2)}$ is a transaction write cache $W_{(m+2,\ 2)}$. It is to be understood that the read cache of the updated transaction may include one or more merged transaction write caches. For example, if there are a plurality of target objects in the target transaction data, the read cache of the updated transaction may be obtained according to the write cache of the merged transactions to which the plurality of target objects belong respectively.

The computer device determines the parallel transaction read data in the read cache of the parallel transaction $R_{(m+3,\ 2)}$ corresponding to the target transaction data $T_{(m+3,\ 2)}$ as the target parallel transaction read data, namely, the transaction read data "the balance of account 60a is 100" in FIG. 6; and determining a target object 60f of the target parallel transaction read data, namely, an account 60a in FIG. 6.

The read cache of the updated transaction $G_{(m+3,\ 2)}$ may include 3 pieces of transaction read data, namely transaction read data "the balance of account 60a is 120", transaction read data "the balance of account 60b is 100", and transaction read data "the balance of account 60c is 220". The computer device acquires updated transaction read data 60e in the read cache of the updated transaction $G_{(m+3,\ 2)}$ according to the target object 60f, namely, the transaction read data "the balance of account 60a is 120" in FIG. 6.

The computer device compares the target parallel transaction read data (namely, the transaction read data "the balance of account 60a is 100") with the updated transaction read data 60e (namely, the transaction read data "the balance of account 60a is 120"), and obviously, if the target parallel transaction read data and the updated transaction read data 60e are not matched, i.e., there is a read data conflict between the target parallel transaction read data and the updated transaction read data 60e, the verification result is determined as the second verification result. As shown in FIG. 6, the computer device acquires contract information $F_{(m+3,\ 2)}$ corresponding to the target transaction data $T_{(m+3,\ 2)}$, determines the target smart contract for executing the target transaction data $T_{(m+3,\ 2)}$ as a transfer contract according to the contract identifier 111 in the contract information $F_{(m+3,\ 2)}$, and determines a target transaction execution service which is called by the transfer contract for executing the target transaction data $T_{(m+3,\ 2)}$ as a transaction transfer service according to the service identifier 1111 in the contract information $F_{(m+3,2)}$.

Referring to FIG. 6 again, the computer device executes the target transaction execution service according to the updated transaction read data 60e (namely transaction read data "the balance of account 60a is 120") and target transaction data $T_{(m+3,\ 2)}$ (as shown in FIG. 6, 20 is transferred from the account 60a to the account 60b), and acquires the target transaction execution result corresponding to the target transaction data $T_{(m+3,\ 2)}$, as shown in FIG. 6, the transaction execution result "the balance of account 60a is 100". According to the target parallel transaction read data (namely the transaction read data "the balance of account 60a is 100") and the target transaction data $T_{(m+3,\ 2)}$, it can be learnt that the target parallel transaction write data in the parallel transaction write cache $W_{(m+3,\ 2)}$ is "the balance of account 60a is 80".

The computer device updates the parallel transaction write cache $W_{(m+3,\ 2)}$ corresponding to the target transaction data $T_{(m+3,\ 2)}$ according to the target transaction execution result, namely the transaction execution result "the balance of account 60a is 100" to obtain a write cache of the transaction to be merged $D_{(m+3,\ 2)}$ of the target transaction data $T_{(m+3,\ 2)}$, as shown in FIG. 6.

In some embodiments, if the target parallel transaction read data is the same as the updated transaction read data 60e, it can be determined that the verification result is the first verification result. The first verification result is used for indicating that there is no read data conflict between the target parallel transaction read data and the updated transaction read data 60e. Then the computer device may determine the parallel transaction write cache $W_{(m+3,\ 2)}$ corresponding to the target transaction data $T_{(m+3,\ 2)}$ as the write cache of the transaction to be merged $D_{(m+3,\ 2)}$ of the target transaction data $T_{(m+3,\ 2)}$.

Through conflict verification, the correctness of the write cache of the transaction to be merged can be further ensured, thus the transaction data processing efficiency can be improved, and meanwhile, the correctness of the data in the block cache can be ensured.

S105: Merge the write cache of the transaction to be merged of the target transaction data into a block cache to which the target transaction data belongs, and continuously merge a write cache of the transaction to be merged of transaction data next to the target transaction data.

Referring to FIG. 6 again, the write cache of the transaction to be merged $D_{(m+3,\ 2)}$ of the target transaction data $T_{(m+3,\ 2)}$ is merged into the block cache $K_{(m+3)}$ to which the target transaction data $T_{(m+3,\ 2)}$ belongs.

The merging process of the write cache of the transaction to be merged corresponding to the subsequent transaction data is consistent with the merging process of the write cache of the transaction to be merged corresponding to the target transaction data $T_{(m+3,\ 2)}$, and no more description is made herein.

It is to be understood that the block cache corresponding to each block is stored in the cache database 50d all the time and is not written into the ledger (not fed into chain) before the consensus module determines that the block can be fed into chain. When the block is determined to be fed into the chain, namely, the consensus result for the block is passed, the data in the block cache in the cache database 50d and the block can be written into the ledger together.

It is to be understood that the performance of the block chain may restrict the application scene of the block chain. The performance indexes of the block chain mainly include two aspects of transaction throughput and time delay. The transaction throughput represents the number of transactions which can be processed by the block chain network at a fixed time. The time delay represents the response and processing time of the block chain network to the transactions.

In some embodiments, it is needed to be investigated based on the above two elements. It is not correct if the transaction throughput is used, and the time delay is ignored. Long-time transaction response can hinder the use of a user, and therefore the user experience is affected. Reducing the number of transactions in the block can reduce the time delay. However, a solution without considering the transaction throughput may cause a large number of transactions queuing in the execution queue. Some platforms need to be capable of processing a large number of concurrent users. Technical solutions with too low transaction throughput will be directly abandoned.

The above problem cannot be solved by simply improving the size of the block. The block needs time for transmission and verification. If the block is too large, the inconsistency of network nodes is increased (more bifurcations generated), and the reliability of the block chain network is seriously influenced. This application is a solution considering transaction throughput and time delay of transaction process, a plurality of blocks are parallel, and a plurality of contracts in the blocks are parallel, thus the plurality of blocks can be processed quickly, the time delay of transaction process can be reduced, and the transaction throughput of the block chain can be improved.

Figure 7:
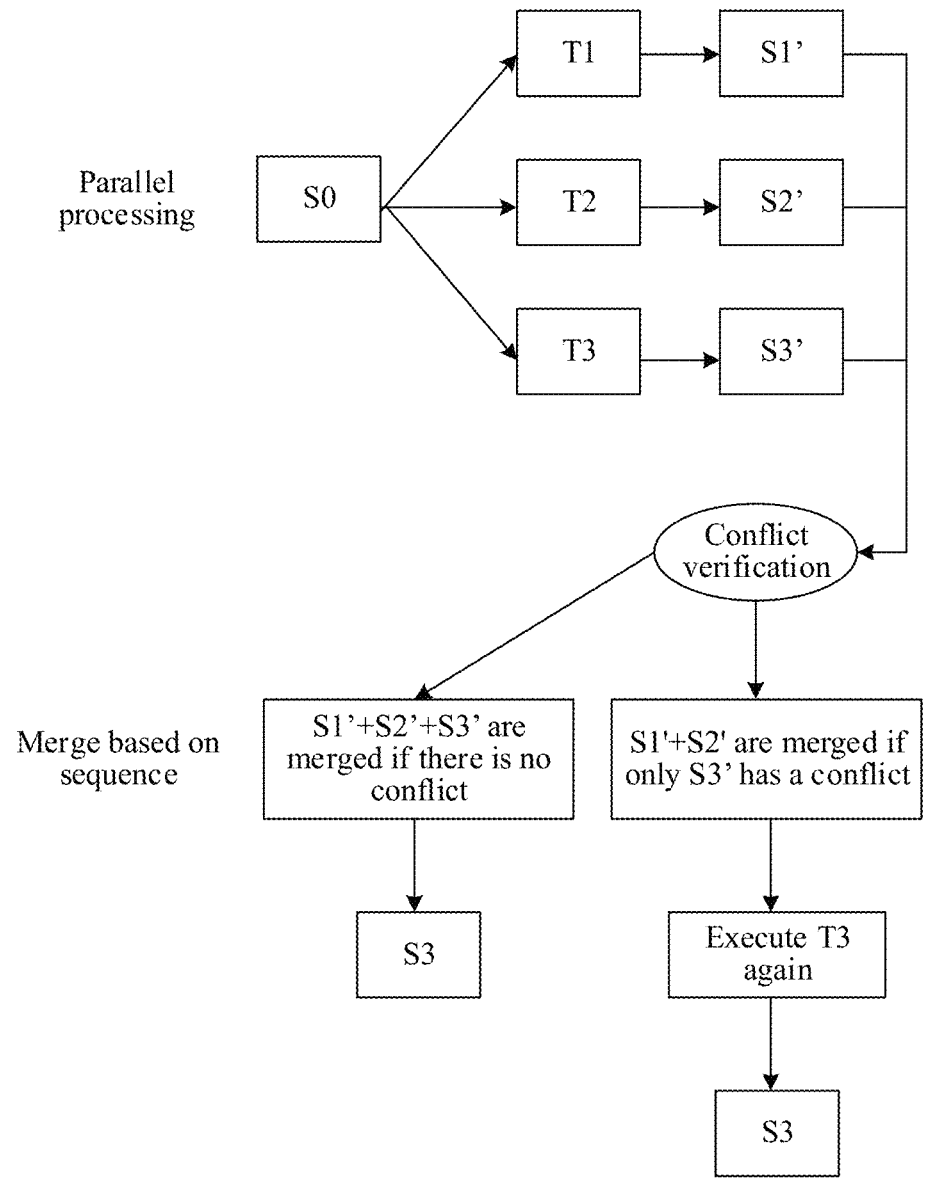
FIG. 7 is a schematic flowchart of a method for processing data based on a block chain provided by an embodiment of this application.

Further referring to FIG. 7, FIG. 7 is a schematic flowchart of a method for processing data based on a block chain provided by an embodiment of this application. As shown in FIG. 7, S0, S1', S2', etc. represent data storage statuses. For example, S0 represents original data, and may also be understood as parallel transaction read data in FIG. 3. S1' represents modified data (may also be understood as parallel transaction write data in FIG. 3) after a transaction request T1 is processed. S2' represents modified data (may also be understood as parallel transaction write data in FIG. 3) after a transaction request T2 is processed. S3' represents modified data (may also be understood as parallel transaction write data in FIG. 3) after a transaction request T3 is processed. S3 is a block cache after the write cache of the transaction to be merged corresponding to the transaction request T1, the transaction request T2 and the transaction request T3 are merged.

The above transaction requests all include contract calling requests which are equal to contract information in FIG. 3. In combination with the corresponding embodiment in FIG. 3 and FIG. 7, the parallel operation on the contract services may be divided into 3 major steps:

1, parallel processing: executing contract services in transaction requests in parallel;
2, conflict verification: verifying whether the parallel execution is reasonable or not in sequence; and
3, transaction merging: merging the execution results of the contract services into the block cache.

After conflict verification is carried out, if it is determined that there is no conflict, S1', S2' and S3' are merged to obtain S3 (for example, there is no conflict, and S1'+S2'+S3' are merged, as shown in FIG. 7). If it is determined that only S3' conflicts, S1' and S2' are merged (for example, only S3' conflicts in FIGS. 7, and S1'+S2' are merged), and T3 is executed again to obtain S3.

For the specific process, reference may be made to the corresponding embodiment in FIG. 3, and no more description is made herein.

In one embodiment of this application, the contract services corresponding to the at least two pieces of transaction data can be executed in parallel according to the contract information carried by the at least two pieces of transaction data respectively. The at least two pieces of transaction data are arranged according to the block height sequence and the sequence of transaction data sequence numbers. The read cache of the parallel transaction and the parallel transaction write cache generated by executing each contract service are acquired. The read cache of the parallel transaction corresponding to the target transaction data may be an older transaction read cache, so the write cache of the merged transaction is determined in the block caches corresponding to the at least two blocks, and then the read cache of the updated transaction corresponding to the target transaction data is acquired in the write cache of the merged transaction. A position or addition time of the transaction data corresponding to the write cache of the merged transaction in the execution queue is in front of the target transaction data. Whether the read cache of the parallel transaction corresponding to the target transaction data is the older transaction read cache or not can be determined according to the read cache of the updated transaction, and thus the write cache of the transaction to be merged of the target transaction data can be determined according to the read cache of the updated transaction and the parallel transaction write cache corresponding to the target transaction data. Therefore, on one hand, a plurality of pieces of transaction data are executed in parallel in this application, thus the efficiency of processing the transaction data by the block chain networks can be improved, the queuing of transaction data in the execution queue is reduced. On the other hand, after the plurality of pieces of transaction data are executed in parallel, the corresponding read cache of an updated transaction can be acquired according to the write cache of the merged transaction corresponding to each piece of transaction data in this application, and then whether the corresponding parallel transaction read cache is the older transaction read cache or not can be determined according to the read cache of the updated transaction corresponding to each piece of transaction data, so that the effect of verifying the read cache of the parallel transaction and the parallel transaction write cache is achieved, the correctness of the write cache of the transaction to be merged can be ensured, and the correctness of the data in the block cache can be ensured while the transaction data processing efficiency is improved.

Figure 8:
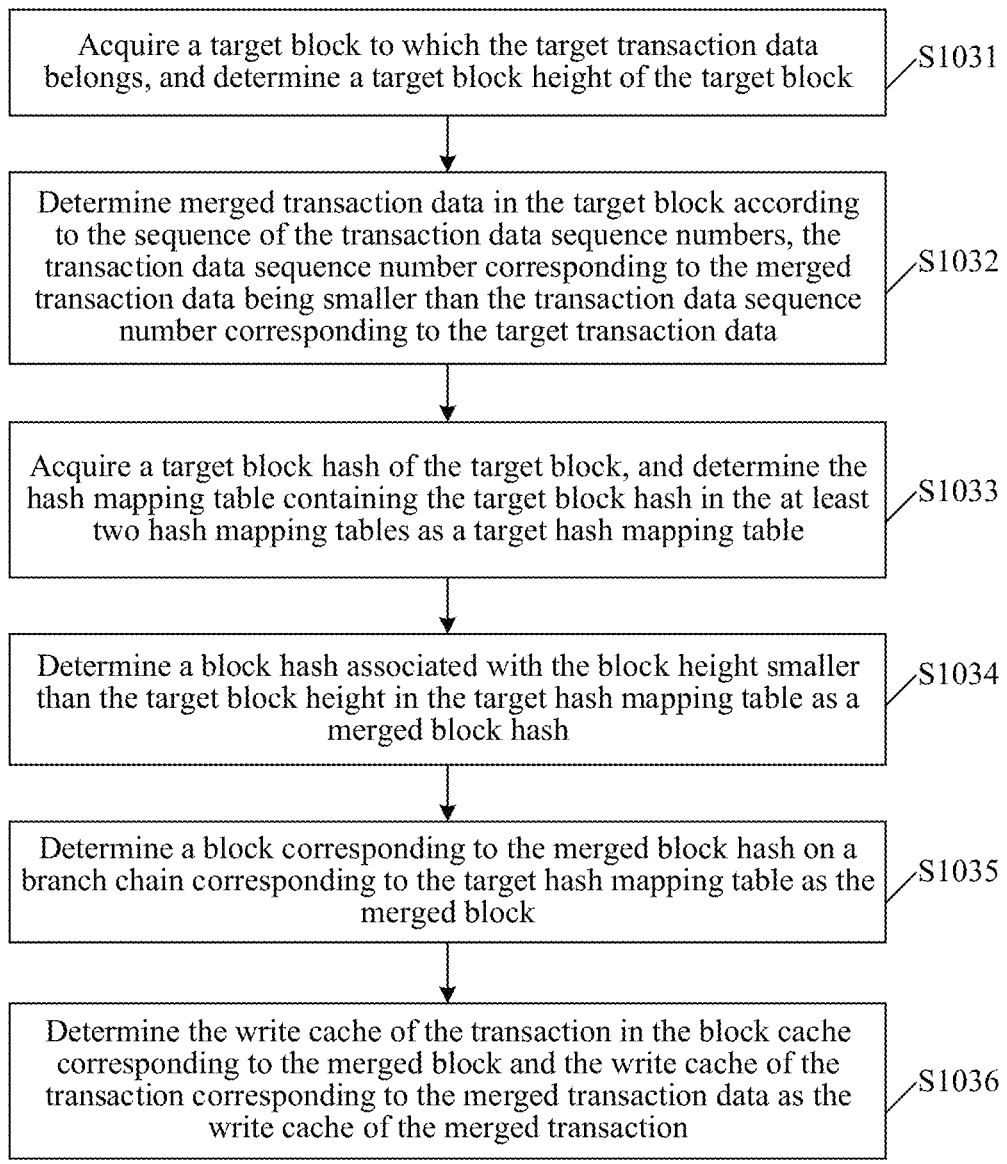
FIG. 8 is a schematic flowchart of a method for processing data based on a block chain provided by an embodiment of this application.

Referring to FIG. 8, FIG. 8 is a schematic flowchart of a method for processing data based on a block chain provided by an embodiment of this application. As shown in FIG. 8, the method for processing data may include the following S1031-S1036, and S1031-S1036 are a specific embodiment of S103 of the corresponding embodiment in FIG. 3.

S1031: Acquire a target block to which target transaction data belongs, and determine a target block height of the target block.

S1032: Determine merged transaction data in the target block according to the sequence of the transaction data sequence numbers, the transaction data sequence number corresponding to the merged transaction data being smaller than the transaction data sequence number corresponding to the target transaction data.

For the specific process of S1031-S1032, reference may be made to S103 in the corresponding embodiment in FIG. 3, and no more description is made herein.

S1033: Acquire a target block hash of the target block, and determine the hash mapping table containing the target block hash in the at least two hash mapping tables as a target hash mapping table.

In one embodiment, the at least two blocks belong to a fork block chain, and the fork block chain includes hash mapping tables corresponding to at least two branch chains respectively. each of the hash mapping tables includes an association relationship between a block height and a block hash on the corresponding branch chain.

In the block chain, a miner digs out a block and links the block to a main chain. Generally speaking, only one block is generated within the same time. If two blocks are generated at the same time, two block chains with the same length, the same transaction information in the blocks but different miner signatures or different transaction sequences appear in the whole network. The situation is called Fork, and the block chains may be called fork block chains at the moment.

As shown in FIG. 5, the block chain to which the target block belongs is a fork block chain. The fork block chain may include two branch chains. One branch chain includes a block m and a fork block 50b. The fork block 50b may include a block 501b, a block 502b, a block 503b and a block m+4. The block height of the block m is m. The block height of the block 501b is m+1. The block height of the block 502b is m+2. The block height of the block 503b is m+3. The block height of the block m+4 is m+4. The other branch chain includes a block m and a fork block 50a. The fork block 50a may include a block 501a, a block 502a and a block 503a. The block height of the block 501a is m+1. The block height of the block 502a is m+2. The block height of the block 503a is m+3.

Referring to FIG. 5 again, the at least two blocks may include a block m, a block 501b, a block 502b, a block 503b, a block m+4, a block 501a, a block 502a and a block 503a. Obviously, the block height of the block 501b is consistent with the block height of the block 501a, and is m+1. The block height of the block 502b is consistent with the block height of the block 502a, and is m+2. The block height of the block 503b is consistent with the block height of the block 503a, and is m+3. Therefore, acquiring the merged block of the target block (namely the block 503b) from the at least two blocks only according to the block height may cause disordering of data. The block height corresponding to the previous block of the block 503b is m+2. But according to the FIG. 5, it can be learnt that the number of the blocks with the block height of m+2 is two, namely the block 502b and the block 502a. Therefore, a solution is needed to accurately determine the merged block for the target block.

According to one embodiment of this application, the hash mapping tables are set for the fork block chain in the cache database 50d. Each hash mapping table includes the association relationship between the block height on corresponding branch chains and block hashes. The merged block of the target block is determined in combination with the block height and the hash mapping tables. As shown in FIG. 5, the cache database 50d includes two hash mapping tables, namely a hash mapping table 1 and a hash mapping table 2. The block height in the hash mapping table 1 may include a block height m+4, a block height m+3, a block height m+2 and a block height m+1. The block hash in the hash mapping table 1 may include a block hash Cb6d3d598e91420a-8eca40c4f8e6d608 corresponding to the block height m+4, a block hash 666d3d5ace91420a8eca40c4f84kd608 corresponding to the block height m+3, a block hash 666d3d5-ace91420a8eca40c4f84kd60 corresponding to the block height m+2, and a block hash 333d3dnb8e91420-a8eca40c4f8e6ytrk corresponding to the block height m+1.

The block height in the hash mapping table 2 may include the block height m+3, the block height m+2 and the block height m+1. The block hash in the hash mapping table 2 may include a block hash 226d3d5ace91420a8ghj40c4f84kd80y corresponding to the block height m+3, a block hash 546d3d598e9jk10a8eca40b908e6d608 corresponding to the block height m+2, and a block hash 346d3d5dek91420-a8eca40c4f84kd222 corresponding to the block height m+1.

The computer device acquires a target block hash of the target block, the block hash 666d3d5ace91420a8-eca40c4f84kd608 as shown in FIG. 5, compares the target block hash with block hashes in the two hash mapping tables, and determining a hash mapping table containing the target block hash in the two hash mapping tables as a target hash mapping table 50c according to a comparison result, i.e., the hash mapping table 1 shown in FIG. 5. At the moment, the computer device determines that the target block is derived from the branch chain corresponding to the hash mapping table 1, and accordingly determines the branch chain including the target block as the target branch chain. The target branch chain may include fork blocks 50b, namely a block 501b, a block 502b, a block 503b and a block m+4.

S1034: Determine a block hash associated with the block height smaller than the target block height in the target hash mapping table as a merged block hash.

For example, in the target hash mapping table, the computer device determines the block height smaller than the target block height (i.e., m+3) as a merged fork block height (i.e., m+2 and m+1 shown in FIG. 5), and determines the fork block hash associated with the merged fork block height as a merged fork block hash, such as a block hash 546d3d598e9jk10a8eca40b908e6d608, and a block hash 346d3d5dek91420a8eca40c4f84kd222 shown in FIG. 5.

S1035: Determine a block corresponding to the merged block hash on a branch chain corresponding to the target hash mapping table as the merged block.

On the branch chain corresponding to the target hash mapping table, namely the target branch chain, the block corresponding to the merged fork block hash is determined as the merged fork block, namely a block 502b and a block 501b. In combination with a block m on the main chain, the target block is determined as a merged block 50e which may include a block 502b, a block 501b and a block m. The computer device determines the transaction write cache in the block cache corresponding to the merged block and the transaction write cache corresponding to the merged transaction data as the write cache of the merged transaction. As shown in FIG. 5 and FIG. 6, the merged transaction data may include transaction data $T_{(m+3,\ 1)}$, and the merged block may include a block 502b, a block 501b and a block m.

S1036: Determine the transaction write cache in the block cache corresponding to the merged block and the transaction write cache corresponding to the merged transaction data as the write cache of the merged transaction.

The transaction write cache in the block cache (the block cache $K_{m+2}$, the block cache $K_{m+1}$ and the block cache $K_m$ shown in FIG. 6) corresponding to the merged block may include a transaction write cache $W_{(m+2,\ 1)}$, a transaction write cache $W_{(m+2,\ 2)}$, a transaction write cache $W_{(m+2,\ 3)}$, a transaction write cache $W_{(m+1,\ 1)}$, a transaction write cache $W_{(m+1,\ 2)}$, a transaction write cache $W_{(m+1,\ 3)}$, a transaction write cache $W_{(m,\ 1)}$, a transaction write cache $W_{(m,\ 2)}$ and a transaction write cache $W_{(m,\ 3)}$. The transaction write cache corresponding to the merged transaction data may include a transaction write cache $W_{(m+3,\ 1)}$ in the block cache $K_{m+3}$.

It is to be understood that the block cache corresponding to each block is stored in the cache database 50d all the time and is not written into the ledger (not fed into chain) before the consensus module determines that the block can be fed into chain. Therefore, this application supports block chain fork. When the block is determined to be fed into the chain (the block is in the longest chain, such as a target branch chain shown in FIG. 5), namely the consensus result for the block is passed, the data in the block cache in the cache database 50d and the block can be written into the ledger together.

Therefore, when there is a fork block in the block chain, the hash mapping table can be set in the block chain network. Therefore, the plurality of blocks and the plurality of contract services can be executed in parallel in the block chain network in one embodiment of this application. The plurality of blocks can include the fork block.

In one embodiment of this application, the contract services corresponding to the at least two pieces of transaction data can be executed in parallel according to the contract information carried by the at least two pieces of transaction data respectively. The at least two pieces of transaction data are arranged according to the block height sequence and the sequence of transaction data sequence numbers. The read cache of the parallel transaction and the parallel transaction write cache generated by executing each contract service are acquired. The read cache of the parallel transaction corresponding to the target transaction data may be an older transaction read cache, so the write cache of the merged transaction is determined in the block caches corresponding to the at least two blocks, and then the read cache of the updated transaction corresponding to the target transaction data is acquired in the write cache of the merged transaction. A position or addition time of the transaction data corresponding to the write cache of the merged transaction in the execution queue is in front of the target transaction data. Whether the read cache of the parallel transaction corresponding to the target transaction data is the older transaction read cache or not can be determined according to the read cache of the updated transaction, and thus the write cache of the transaction to be merged of the target transaction data can be determined according to the read cache of the updated transaction and the parallel transaction write cache corresponding to the target transaction data. Therefore, on one hand, a plurality of pieces of transaction data are executed in parallel in this application, thus the efficiency of processing the transaction data by the block chain networks can be improved, the queuing of transaction data in the execution queue is reduced. On the other hand, after the plurality of pieces of transaction data are executed in parallel, the corresponding read cache of an updated transaction can be acquired according to the write cache of the merged transaction corresponding to each piece of transaction data in this application, and then whether the corresponding parallel transaction read cache is the older transaction read cache or not can be determined according to the read cache of the updated transaction corresponding to each piece of transaction data, so that the effect of verifying the read cache of the parallel transaction and the parallel transaction write cache is achieved, the correctness of the write cache of the transaction to be merged can be ensured, and the correctness of the data in the block cache can be ensured while the transaction data processing efficiency is improved.

Figure 9:
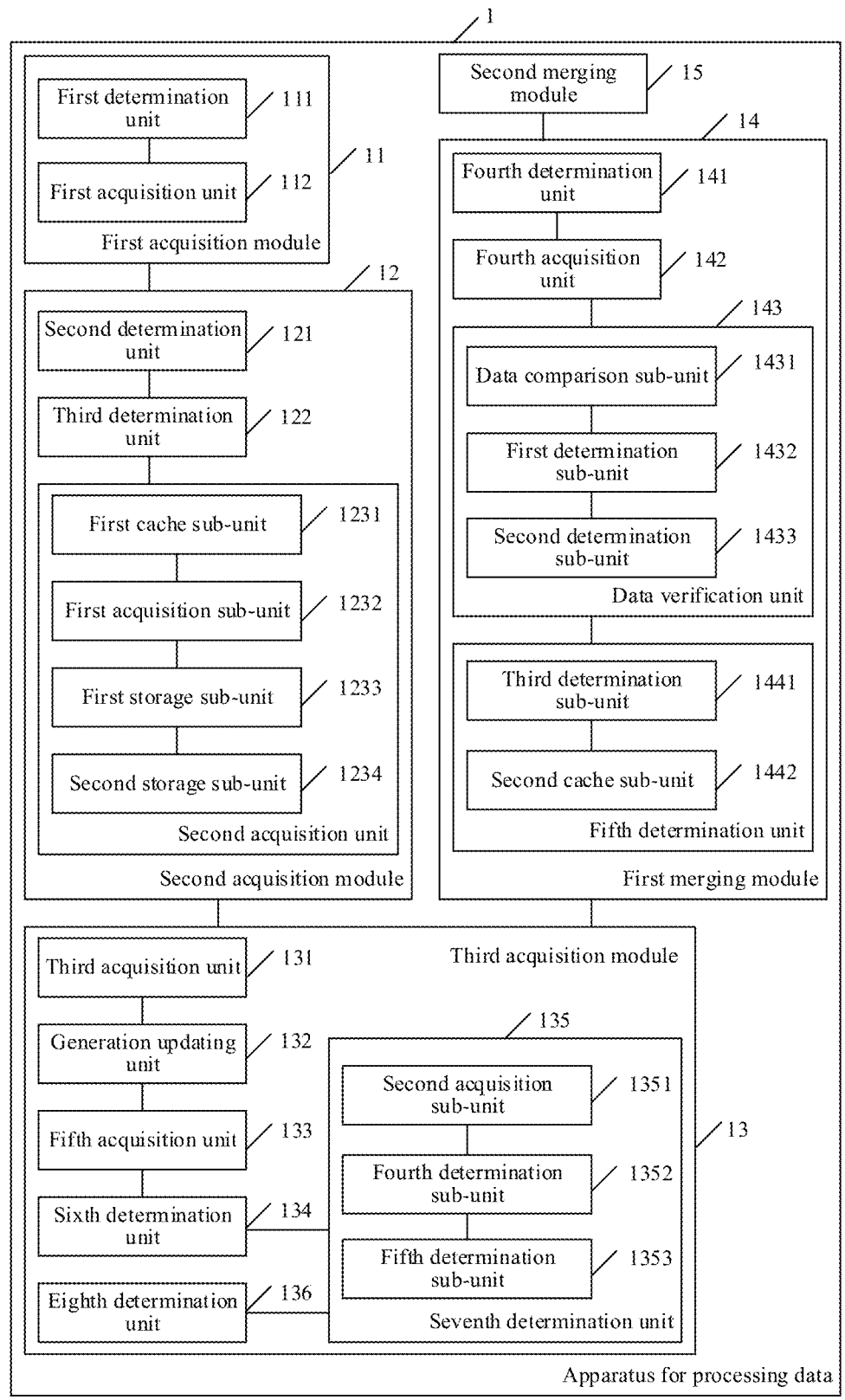
FIG. 9 is a schematic structure diagram of an apparatus for processing data based on a block chain provided by an embodiment of this application.

As shown in FIG. 9, FIG. 9 is a schematic structure diagram of an apparatus for processing data based on a block chain provided by an embodiment of this application. The apparatus for processing data may be a computer program (including program codes) running in the computer device, for example, the apparatus for processing data is application software. The apparatus is configured to execute corresponding steps in the method provided by one embodiment of this application. As shown in FIG. 9, the apparatus 1 for processing data may include a first acquisition module 11, a second acquisition module 12, a third acquisition module 13, a first merging module 14 and a second merging module 15.

The first acquisition module 11 is configured to add transaction data in at least two blocks into an execution queue according to a block height sequence and a sequence of transaction data sequence numbers, and acquire at least two pieces of transaction data from the execution queue in sequence. The at least two pieces of transaction data carry contract information.

The second acquisition module 12 is configured to execute contract services corresponding to the contract information carried by the at least two pieces of transaction data in parallel, and acquire a parallel transaction read cache and a parallel transaction write cache generated by executing each contract service. The at least two pieces of transaction data include target transaction data.

The third acquisition module 13 is configured to determine a merged transaction write cache in block caches respectively corresponding to the at least two blocks, and acquire an read cache of an updated transaction corresponding to the target transaction data in the write cache of the merged transaction. A position or addition time of the transaction data corresponding to the write cache of the merged transaction in the execution queue is in front of the target transaction data.

The first merging module 14 is configured to determine a write cache of the transaction to be merged of the target transaction data according to the read cache of the updated transaction, the read cache of the parallel transaction corresponding to the target transaction data and the parallel transaction write cache corresponding to the target transaction data.

The second merging module 15 is configured to merge the write cache of the transaction to be merged of the target transaction data into a block cache to which the target transaction data belongs, and continuously merge a write cache of the transaction to be merged of transaction data next to the target transaction data. For the specific function implementations of the first acquisition module 11, the second acquisition module 12, the third acquisition module 13, the first merging module 14 and the second merging module 15, reference may be made to S101-S105 in the corresponding embodiment in FIG. 3, and no more description is made herein.

The at least two pieces of transaction data are from different blocks.

Referring to FIG. 9 again, the first acquisition module 11 may include a first determination unit 111 and a first acquisition unit 112.

The first determination unit 111 is configured to determine an idle number corresponding to idle threads in a parallel execution thread pool.

The first acquisition unit 112 is configured to acquire the at least two pieces of transaction data from the execution queue in sequence through the idle threads when the idle number is equal to or greater than a parallel execution thread threshold. A transaction number of the at least two pieces of transaction data is equal to the idle number.

For the specific function implementations of the first determination unit 111 and the first acquisition unit 112, reference may be made to S101 in the corresponding embodiment in FIG. 3, and no more description is made herein.

Referring to FIG. 9 again, the at least two contract services include at least two smart contracts and at least two transaction execution services.

The second acquisition module 12 may include a second determination unit 121, a third determination unit 122 and a second acquisition unit 123.

The second determination unit 121 is configured to determine the smart contracts used for executing the at least two pieces of transaction data according to contract identifiers included in the at least two pieces of contract information respectively.

The third determination unit 122 is configured to determine transaction execution services called by the at least two smart contracts respectively for executing the at least pieces of two transaction data according to the service identifiers included in the at least two pieces of contract information respectively.

The second acquisition unit 123 is configured to execute the at least two transaction execution services in parallel, and acquire a parallel transaction read cache and a parallel transaction write cache generated by executing each transaction execution service.

For the specific function implementations of the second determination unit 121, the third determination unit 122 and the second acquisition unit 123, reference may be made to S102 in the corresponding embodiment in FIG. 3, and no more description is made herein.

Referring to FIG. 9 again, the second acquisition unit 123 may include a first cache sub-unit 1231, a first acquisition sub-unit 1232, a first storage sub-unit 1233 and a second storage sub-unit 1234.

The first cache sub-unit 1231 is configured to correspondingly create an initial transaction read cache and an initial transaction write cache respectively for the at least two pieces of transaction data according to the at least two transaction execution services.

The first acquisition sub-unit 1232 is configured to execute the at least two transaction execution services in parallel, and acquire parallel transaction read data and parallel transaction write data generated by executing each transaction execution service.

The first storage sub-unit 1233 is configured to store each piece of parallel transaction read data into the corresponding initial transaction read cache to obtain parallel transaction read caches corresponding to the at least two pieces of transaction data respectively.

The second storage sub-unit 1234 is configured to store each piece of parallel transaction write data into the corresponding initial transaction write cache to obtain parallel transaction write caches corresponding to the at least two pieces of transaction data respectively.

For the specific function implementations of the first cache sub-unit 1231, the first acquisition sub-unit 1232, the first storage sub-unit 1233 and the second storage sub-unit 1234, reference may be made to S102 in the corresponding embodiment in FIG. 3, and no more description is made herein.

Referring to FIG. 9 again, the third acquisition module 13 may include a third acquisition unit 131 and a generation updating unit 132.

The third acquisition unit 131 is configured to sequentially traverse the write cache of the merged transactions according to a block height sequence from high to low and a sequence of transaction data sequence numbers from large to small until acquiring the write cache of the merged transaction to be read for the target transaction data.

The generation updating unit 132 is configured to generate the read cache of the updated transaction according to the write cache of the merged transaction to be read for the target transaction data.

For the specific function implementations of the third acquisition unit 131 and the generation updating unit 132, reference may be made to S103 in the corresponding embodiment in FIG. 3, and no more description is made herein.

Referring to FIG. 9 again, the first merging module 14 may include a data verification unit 143 and a fifth determination unit 144.

The data verification unit 143 is configured to perform read data conflict verification on the read cache of the parallel transaction corresponding to the target transaction data and the read cache of the updated transaction to obtain a verification result.

The fifth determination unit 144 is configured to determine the write cache of the transaction to be merged of the target transaction data according to the verification result and the parallel transaction write cache corresponding to the target transaction data.

Referring to FIG. 9 again, the first merging module 14 may include a fourth determination unit 141 and a fourth acquisition unit 142.

The fourth determination unit 141 is configured to determine parallel transaction read data in the read cache of the parallel transaction corresponding to the target transaction data as target parallel transaction read data.

The fourth acquisition unit 142 is configured to determine a target object of the target parallel transaction read data, and acquire updated transaction read data associated with the target object in the read cache of the updated transaction.

The data verification unit 143 is configured to perform read data conflict verification on the target parallel transaction read data determined by the fourth determination unit 141 and the updated transaction read data acquired by the fourth acquisition unit 142 to obtain the verification result.

For the specific function implementations of the fourth determination unit 141, the fourth acquisition unit 142, the data verification unit 143 and the fifth determination unit 144, reference may be made to S104 in the corresponding embodiments in FIG. 3, and no more description is made herein.

As shown in FIG. 9, the verification result includes the first verification result and the second verification result.

The data verification unit 143 may include a data comparison sub-unit 1431, a first determination sub-unit 1432 and a second determination sub-unit 1433.

The data comparison sub-unit 1431 is configured to compare the target parallel transaction read data with the updated transaction read data.

The first determination sub-unit 1432 is configured to determine the verification result as the first verification result when the target parallel transaction read data is the same as the updated transaction read data. The first verification result is used for indicating that there is no read data conflict between the target parallel transaction read data and the updated transaction read data.

The second determination sub-unit 1433 is configured to determine the verification result as the second verification result when the target parallel transaction read data is different from the updated transaction read data. The second verification result is used for indicating that a read data conflict exists between the target parallel transaction read data and the updated transaction read data.

For the specific function implementations of the data comparison sub-unit 1431, the first determination sub-unit 1432 and the second determination sub-unit 1433, reference may be made to S104 in the corresponding embodiments in FIG. 3, and no more description is made herein.

Referring to FIG. 9 again, the fifth determination unit 144 may include a third determination sub-unit 1441 and a second cache sub-unit 1442.

The third determination sub-unit 1441 is configured to determine the parallel transaction write cache corresponding to target transaction data as the write cache of the transaction to be merged of the target transaction data when the first verification result is the first verification result.

The second cache sub-unit 1442 is configured to generate the write cache of the transaction to be merged of the target transaction data according to the updated transaction read data and contract information carried by the target transaction data when the verification result is the second verification result.

For the specific function implementations of the third determination sub-unit 1441 and the second cache sub-unit 1442, reference may be made to S104 in the corresponding embodiment in FIG. 3, and no more description is made herein.

Referring to FIG. 9 again, the second cache sub-unit 1442 is further configured to determine a target smart contract used for executing the target transaction data according to the contract identifiers in the contract information carried by the target transaction data.

The second cache sub-unit 1442 is further configured to determine a target transaction execution service called by the target smart contract for executing the target transaction data according to the service identifiers in the contract information carried by the target transaction data.

The second cache sub-unit 1442 is further configured to execute the target transaction execution service according to the updated transaction read data and the target transaction data, and acquire a target transaction execution result corresponding to the target transaction data.

The second cache sub-unit 1442 is further configured to update the parallel transaction write cache corresponding to the target transaction data according to the target transaction execution result to obtain the write cache of the transaction to be merged of the target transaction data.

For the specific function implementation of the second cache sub-unit 1442, reference may be made to S104 in the corresponding embodiment in FIG. 3, and no more description is made herein.

Referring to FIG. 9 again, the third acquisition module 13 may include a fifth acquisition unit 133, a sixth determination unit 134, a seventh determination unit 135 and an eighth determination unit 136.

The fifth acquisition unit 133 is configured to acquire a target block to which target transaction data belongs, and determine a target block height of the target block.

The sixth determination unit 134 is configured to determine merged transaction data in the target block according to the sequence of the transaction data sequence numbers. The transaction data sequence number corresponding to the merged transaction data is smaller than the transaction data sequence number corresponding to the target transaction data.

The seventh determination unit 135 is configured to determine the merged block from the at least two blocks according to the target block height. A block height of the merged block is smaller than the target block height.

The eighth determination unit 136 is configured to determine the transaction write cache in the block cache corresponding to the merged block and the transaction write cache corresponding to the merged transaction data as the write cache of the merged transaction.

For the specific function implementations of the fifth acquisition unit 133, the sixth determination unit 134, the seventh determination unit 135 and the eighth determination unit 136, reference may be made to S1031-S1036 in the corresponding embodiments in FIG. 8, and no more description is made herein.

Referring to FIG. 9 again, the at least two blocks belong to the fork block chain. The fork block chain includes hash mapping tables corresponding to at least two branch chains respectively. Each of the hash mapping tables includes an association relationship between a block height and a block hash on the corresponding branch chain.

The seventh determination unit 135 may include a second acquisition sub-unit 1351, a fourth determination sub-unit 1352 and a fifth determination sub-unit 1353.

The second acquisition sub-unit 1351 is configured to acquire a target block hash of the target block, and determine the hash mapping table containing the target block hash in the at least two hash mapping tables as the target hash mapping table.

The fourth determination sub-unit 1352 is configured to determine a block hash associated with the block height smaller than the target block height in the target hash mapping table as a merged block hash.

The fifth determination sub-unit 1353 is configured determine a block corresponding to the merged block hash on a branch chain corresponding to the target hash mapping table as the merged block.

For the specific function implementation of the second acquisition sub-unit 1351, the fourth determination sub-unit 1352 and the fifth determination sub-unit 1353, reference may be made to S1033-S1035 in corresponding embodiments in FIG. 8, and no more description is made herein.

In one embodiment of this application, the contract services corresponding to the at least two pieces of transaction data can be executed in parallel according to the contract information carried by the at least two pieces of transaction data respectively. The at least two pieces of transaction data are arranged according to the block height sequence and the sequence of transaction data sequence numbers. The read cache of the parallel transaction and the parallel transaction write cache generated by executing each contract service are acquired. The read cache of the parallel transaction corresponding to the target transaction data may be an older transaction read cache, so the write cache of the merged transaction is determined in the block caches corresponding to the at least two blocks, and then the read cache of the updated transaction corresponding to the target transaction data is acquired in the write cache of the merged transaction. A position or addition time of the transaction data corresponding to the write cache of the merged transaction in the execution queue is in front of the target transaction data. Whether the read cache of the parallel transaction corresponding to the target transaction data is the older transaction read cache or not can be determined according to the read cache of the updated transaction, and thus the write cache of the transaction to be merged of the target transaction data can be determined according to the read cache of the updated transaction and the parallel transaction write cache corresponding to the target transaction data. Therefore, on one hand, a plurality of pieces of transaction data are executed in parallel in this application, thus the efficiency of processing the transaction data by the block chain networks can be improved, the queuing of transaction data in the execution queue is reduced. On the other hand, after the plurality of pieces of transaction data are executed in parallel, the corresponding read cache of an updated transaction can be acquired according to the write cache of the merged transaction corresponding to each piece of transaction data in this application, and then whether the corresponding parallel transaction read cache is the older transaction read cache or not can be determined according to the read cache of the updated transaction corresponding to each piece of transaction data, so that the effect of verifying the read cache of the parallel transaction and the parallel transaction write cache is achieved, the correctness of the write cache of the transaction to be merged can be ensured, and the correctness of the data in the block cache can be ensured while the transaction data processing efficiency is improved.

Figure 10:
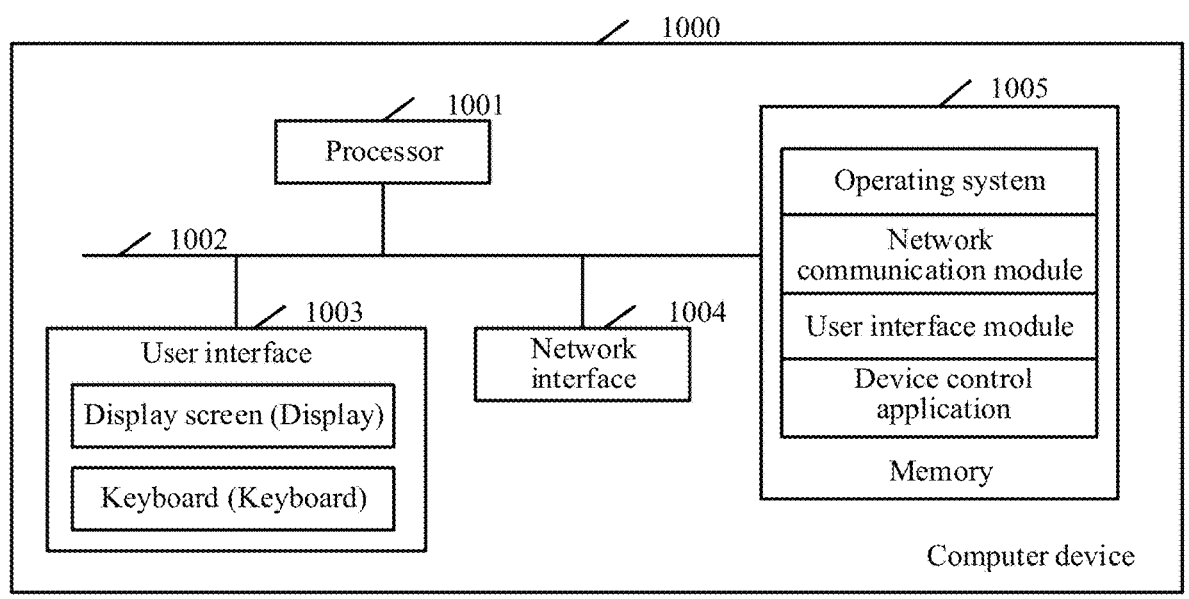
FIG. 10 is a schematic structure diagram of a computer device provided by an embodiment of this application.

FIG. 10 is a schematic structural diagram of a computer device according to an embodiment of this application. As shown in FIG. 10, the computer device 1000 may include: at least one processor 1001, for example, a CPU, at least one network interface 1004, a user interface 1003, a memory 1005, and at least one communication bus 1002. The communication bus 1002 is configured to implement connection and communication between the components. The user interface 1003 may include a display and a keyboard. The network interface 1004 may include a standard wired interface and a wireless interface (such as a WI-FI interface). The memory 1005 may be a high-speed RAM, or may be a non-volatile memory, for example, at least one magnetic disk memory. In some embodiments, the memory 1005 may be at least one storage apparatus that is located far away from the foregoing processor 1001. As shown in FIG. 10, the memory 1005 used as a computer storage medium may include an operating system, a network communication module, a user interface module, and a device-control application program.

In the computer device 1000 shown in FIG. 10, the network interface 1004 may provide a network communication function; the user interface 1003 is mainly configured to provide an input interface for the user; and the processor 1001 may be configured to call the device control application stored in the memory 1005 to implement:

adding transaction data in at least two blocks into an execution queue according to a block height sequence and a sequence of transaction data sequence numbers, and acquiring at least two pieces of transaction data from the execution queue in sequence, the at least two pieces of transaction data carrying contract information;

executing contract services corresponding to the contract information carried by the at least two pieces of transaction data in parallel, and acquiring a parallel transaction read cache and a parallel transaction write cache generated by executing each contract service, the at least two pieces of transaction data including target transaction data;

determining a merged transaction write cache in block caches respectively corresponding to the at least two blocks, and acquiring an read cache of an updated transaction corresponding to the target transaction data in the write cache of the merged transaction, a position or addition time of the transaction data corresponding to the write cache of the merged transaction in the execution queue being in front of the target transaction data;

determining a write cache of the transaction to be merged of the target transaction data according to the read cache of the updated transaction, the read cache of the parallel transaction corresponding to the target transaction data and the parallel transaction write cache corresponding to the target transaction data; and merging the write cache of the transaction to be merged of the target transaction data into a block cache to which the target transaction data belongs, and continuously merging a write cache of the transaction to be merged of transaction data next to the target transaction data.

It is to be understood that, the computer device 1000 described in one embodiment of this application may implement the descriptions of the blockchain-based data processing method in the embodiments corresponding to FIG. 3, FIG. 7, and FIG. 8 respectively, or the descriptions of the data processing apparatus 1 in the embodiment corresponding to FIG. 9. Details are not described herein again. In addition, the description of beneficial effects of the same method is not described herein again.

One embodiment of this application further provides a computer-readable storage medium. The computer-readable storage medium stores a computer program. The computer program includes a program instruction which may implement the method for processing data based on the block chain provided by each step in FIG. 3, FIG. 7 and FIG. 8 when being executed by the processor. For the specific process, reference may be made to the implementations provided by each step in FIG. 3, FIG. 7 and FIG. 8, and no more description is made herein. In addition, the description of beneficial effects of the same method is not described herein again.

The above computer-readable storage medium may be the apparatus for processing data based on the block chain provided by any one of the embodiments or an internal storage unit of the computer device, such as a hard disk or an internal memory of the computer device. The computer-readable storage medium may also be an external storage device of the computer device, such as a plug-in hard disk, a smart media card (SMC), a secure digital (SD) card, or a flash card that is equipped on the computer device. The computer-readable storage medium may also include an internal storage unit of the computer device and an external storage device. The computer-readable storage medium is configured to store the computer program and another program and data that are required by the computer device. The computer-readable storage medium may be further configured to temporarily store data that has been outputted or data to be outputted.

The embodiments of this application further provide a computer program product or a computer program. The computer program product or the computer program includes computer instructions, the computer instructions being stored in a computer-readable storage medium. A processor of a computer device reads the computer instructions from the computer-readable storage medium and executes the computer instructions to cause the computer device to perform the description of the blockchain-based data processing method in the foregoing embodiment corresponding to FIG. 3, FIG. 7, and FIG. 8 respectively, and details are not repeated herein. In addition, the description of beneficial effects of the same method is not described herein again.

In one embodiment of this application, claims, and accompanying drawings of this application, the terms "first" and "second" are intended to distinguish between different objects but do not indicate a particular order. In addition, the term "include", and any variant thereof are intended to cover a non-exclusive inclusion. For example, a process, method, apparatus, product, or device that includes a series of steps or modules is not limited to the listed steps or modules. These steps may include a step or module that is not listed, or further may include another step or unit that is intrinsic to the process, method, apparatus, product, or device.

A person of ordinary skill in the art may be aware that the units, modules, and algorithm steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

The methods and related apparatuses provided by the embodiments of this application are described with reference to the method flowcharts and/or schematic structural diagrams provided in the embodiments of this application. Specifically, each process of the method flowcharts and/or each block of the schematic structural diagrams, and a combination of processes in the flowcharts and/or blocks in the block diagrams can be implemented by computer program instructions. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the schematic structural diagrams. These computer program instructions may also be stored in a computer-readable memory that can guide a computer or another programmable data processing device to work in a specified manner, so that the instructions stored in the computer-readable memory generate a product including an instruction apparatus, where the instruction apparatus implements functions specified in one or more processes in the flowcharts and/or one or more blocks in the schematic structural diagrams. The computer program instructions may also be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the schematic structural diagrams.

What are disclosed above are merely examples of embodiments of this application, and certainly are not intended to limit the protection scope of this application. Therefore, equivalent variations made in accordance with the claims of this application shall fall within the scope of this application.

What is claimed is:

1. A method for processing data based on a block chain, executed by a computer device, comprising:
    adding transaction data in at least two blocks into an execution queue according to a block height sequence and transaction data sequence numbers, and acquiring at least two pieces of transaction data from the execution queue in sequence, the at least two pieces of transaction data carrying contract information;
    executing contract services corresponding to the contract information carried by the at least two pieces of transaction data in parallel, and acquiring a read cache and a write cache of a parallel transaction generated by executing each contract service, the at least two pieces of transaction data comprising target transaction data;
    determining a write cache of a merged transaction in block caches respectively corresponding to the at least two blocks, and acquiring a read cache of an updated transaction corresponding to the target transaction data in the write cache of the merged transaction, a position or addition time of the transaction data corresponding to the write cache of the merged transaction in the execution queue being in front of the target transaction data;
    determining a write cache of the transaction to be merged of the target transaction data according to the read cache of the updated transaction, the read cache of the parallel transaction corresponding to the target transaction data and the write cache of the parallel transaction corresponding to the target transaction data; and merging the write cache of the transaction to be merged of the target transaction data into a block cache to which the target transaction data belongs, and continuously merging a write cache of the transaction to be merged of the transaction data next to the target transaction data.

2. The method according to claim 1, wherein the at least two pieces of transaction data are acquired from different blocks.

3. The method according to claim 1, wherein the determining a write cache of the transaction to be merged of the target transaction data according to the read cache of the updated transaction, the read cache of the parallel transaction corresponding to the target transaction data and the parallel transaction write cache corresponding to the target transaction data comprises:

performing read data conflict verification on the read cache of the parallel transaction corresponding to the target transaction data and the read cache of the updated transaction to obtain a verification result; and determining the write cache of the transaction to be merged of the target transaction data according to the verification result and the parallel transaction write cache corresponding to the target transaction data.

4. The method according to claim 1, wherein the acquiring at least two pieces of transaction data from the execution queue in sequence comprises:

determining an idle number corresponding to idle threads in a parallel execution thread pool; and acquiring the at least two pieces of transaction data from the execution queue in sequence through the idle threads when the idle number is equal to or greater than a parallel execution thread threshold, a transaction number of the at least two pieces of transaction data being equal to the idle number.

5. The method according to claim 1, wherein the contract services corresponding to the contract information carried by the at least two pieces of transaction data comprise at least two smart contracts and at least two transaction execution services; and the executing contract services corresponding to the contract information carried by the at least two pieces of transaction data in parallel, and acquiring a parallel transaction read cache and a parallel transaction write cache generated by executing each contract service comprises:

determining the smart contracts used for executing the at least two pieces of transaction data according to contract identifiers comprised in the at least two pieces of contract information respectively;

determining transaction execution services called by the at least two smart contracts respectively for executing the at least two pieces of transaction data according to the service identifiers comprised in the at least two pieces of contract information respectively; and executing the at least two transaction execution services in parallel, and acquiring a parallel transaction read cache and a parallel transaction write cache generated by executing each transaction execution service.

6. The method according to claim 5, wherein the executing the at least two transaction execution services in parallel, and acquiring a read cache of a parallel transaction and a write cache of a parallel transaction generated by executing each transaction execution service comprises:

Creating a read cache of an initial transaction and a write cache of an initial transaction for the at least two pieces of transaction data according to the at least two transaction execution services;

executing the at least two transaction execution services in parallel, and acquiring parallel transaction read data and parallel transaction write data generated by executing each transaction execution service;

storing each piece of parallel transaction read data into the corresponding initial transaction read cache to obtain parallel transaction read caches corresponding to the at least two pieces of transaction data respectively; and storing each piece of parallel transaction write data into the corresponding the write cache of the initial transaction to obtain write caches of parallel transaction corresponding to the at least two pieces of transaction data respectively.

7. The method according to claim 1, wherein the acquiring a read cache of an updated transaction corresponding to the target transaction data in the write cache of the merged transaction comprises:

sequentially traversing the write cache of the merged transactions according to a block height sequence from high to low and a sequence of transaction data sequence numbers from large to small to obtain the write cache of the merged transaction to be read for the target transaction data; and generating the read cache of the updated transaction according to the write cache of the merged transaction to be read for the target transaction data.

8. The method according to claim 3, wherein the performing read data conflict verification on the read cache of the parallel transaction corresponding to the target transaction data and the read cache of the updated transaction to obtain a verification result comprises:

determining parallel transaction read data in the read cache of the parallel transaction corresponding to the target transaction data as target parallel transaction read data;

determining a target object of the target parallel transaction read data, and acquiring updated transaction read data associated with the target object in the read cache of the updated transaction; and performing read data conflict verification on the target parallel transaction read data and the updated transaction read data to obtain the verification result.

9. The method according to claim 8, wherein the verification result comprises a first verification result and a second verification result; and the performing read data conflict verification on the target parallel transaction read data and the updated transaction read data to obtain the verification result comprises:

comparing the target parallel transaction read data with the updated transaction read data;

determining the verification result as the first verification result when the target parallel transaction read data is the same as the updated transaction read data, the first verification result being used for indicating that there is no read data conflict between the target parallel transaction read data and the updated transaction read data; and determining the verification result as the second verification result when the target parallel transaction read data is different from the updated transaction read data, the second verification result being used for indicating that a read data conflict exists between the target parallel transaction read data and the updated transaction read data.

10. The method according to claim 9, wherein the determining the write cache of the transaction to be merged of the target transaction data according to the verification result and the parallel transaction write cache corresponding to the target transaction data comprises:
determining the write cache of the parallel transaction corresponding to the target transaction data as the write cache of the transaction to be merged of the target transaction data when the first verification result is the first verification result; and
generating the write cache of the transaction to be merged of the target transaction data according to the updated transaction read data and contract information carried by the target transaction data when the verification result is the second verification result.

11. The method according to claim 10, wherein the generating the write cache of the transaction to be merged of the target transaction data according to the updated transaction read data and the contract information carried by the target transaction data comprises:
determining a target smart contract used for executing the target transaction data according to the contract identifiers in the contract information carried by the target transaction data;
determining a target transaction execution service called by the target smart contract for executing the target transaction data according to the service identifiers in the contract information carried by the target transaction data;
executing the target transaction execution service according to the updated transaction read data and the target transaction data, and acquiring a target transaction execution result corresponding to the target transaction data; and
updating the parallel transaction write cache corresponding to the target transaction data according to the target transaction execution result to obtain the write cache of the transaction to be merged of the target transaction data.

12. The method according to claim 1, wherein the determining a write cache of the merged transaction in block caches respectively corresponding to the at least two blocks comprises:
acquiring a target block to which the target transaction data belongs, and determining a target block height of the target block;
determining merged transaction data in the target block according to the sequence of the transaction data sequence numbers, the transaction data sequence number corresponding to the merged transaction data being smaller than the transaction data sequence number corresponding to the target transaction data;
determining the merged block from the at least two blocks according to the target block height, a block height of the merged block being smaller than the target block height; and
determining the transaction write cache in the block cache corresponding to the merged block and the transaction write cache corresponding to the merged transaction data as the write cache of the merged transaction.

13. The method according to claim 12, wherein the at least two blocks belong to a fork block chain, and the fork block chain comprises hash mapping tables corresponding to at least two branch chains respectively; each of the hash mapping tables comprises an association relationship between a block height and a block hash on the corresponding branch chain; and
the determining the merged block from the at least two blocks according to the target block height comprises:
acquiring a target block hash of the target block, and determining the hash mapping table containing the target block hash in the at least two hash mapping tables as a target hash mapping table;
determining a block hash associated with the block height smaller than the target block height in the target hash mapping table as a merged block hash; and
determining a block corresponding to the merged block hash on a branch chain corresponding to the target hash mapping table as the merged block.

14. A computer device, comprising: a processor, a memory, and a network interface;
the processor being connected to the memory and the network interface, the network interface being configured to provide a data communication function, the memory being configured to store a computer program, and the processor being configured to invoke the computer program to cause the computer device to perform a method for processing data based on a block chain comprising:
adding transaction data in at least two blocks into an execution queue according to a block height sequence and transaction data sequence numbers, and acquiring at least two pieces of transaction data from the execution queue in sequence, the at least two pieces of transaction data carrying contract information;
executing contract services corresponding to the contract information carried by the at least two pieces of transaction data in parallel, and acquiring a read cache and a write cache of a parallel transaction generated by executing each contract service, the at least two pieces of transaction data comprising target transaction data;
determining a write cache of a merged transaction in block caches respectively corresponding to the at least two blocks, and acquiring a read cache of an updated transaction corresponding to the target transaction data in the write cache of the merged transaction, a position or addition time of the transaction data corresponding to the write cache of the merged transaction in the execution queue being in front of the target transaction data;
determining a write cache of the transaction to be merged of the target transaction data according to the read cache of the updated transaction, the read cache of the parallel transaction corresponding to the target transaction data and the write cache of the parallel transaction corresponding to the target transaction data; and
merging the write cache of the transaction to be merged of the target transaction data into a block cache to which the target transaction data belongs, and continuously merging a write cache of the transaction to be merged of the transaction data next to the target transaction data.

15. The computer device according to claim 14, wherein the at least two pieces of transaction data are acquired from different blocks.

16. The computer device according to claim 14, wherein the determining a write cache of the transaction to be merged of the target transaction data according to the read cache of the updated transaction, the read cache of the parallel transaction corresponding to the target transaction data and the parallel transaction write cache corresponding to the target transaction data comprises:
  performing read data conflict verification on the read cache of the parallel transaction corresponding to the target transaction data and the read cache of the updated transaction to obtain a verification result; and
  determining the write cache of the transaction to be merged of the target transaction data according to the verification result and the parallel transaction write cache corresponding to the target transaction data.

17. The computer device according to claim 14, wherein the acquiring at least two pieces of transaction data from the execution queue in sequence comprises:
  determining an idle number corresponding to idle threads in a parallel execution thread pool; and
  acquiring the at least two pieces of transaction data from the execution queue in sequence through the idle threads when the idle number is equal to or greater than a parallel execution thread threshold, a transaction number of the at least two pieces of transaction data being equal to the idle number.

18. The computer device according to claim 14, wherein the contract services corresponding to the contract information carried by the at least two pieces of transaction data comprise at least two smart contracts and at least two transaction execution services; and
  the executing contract services corresponding to the contract information carried by the at least two pieces of transaction data in parallel, and acquiring a parallel transaction read cache and a parallel transaction write cache generated by executing each contract service comprises:
  determining the smart contracts used for executing the at least two pieces of transaction data according to contract identifiers comprised in the at least two pieces of contract information respectively;
  determining transaction execution services called by the at least two smart contracts respectively for executing the at least two pieces of transaction data according to the service identifiers comprised in the at least two pieces of contract information respectively; and
  executing the at least two transaction execution services in parallel, and acquiring a parallel transaction read cache and a parallel transaction write cache generated by executing each transaction execution service.

19. A non-transitory computer-readable storage medium, storing a computer program, the computer program, applicable to be loaded and executed by a processor, causing a computer device comprising the processor to perform a method for processing data based on a block chain comprising:
  adding transaction data in at least two blocks into an execution queue according to a block height sequence and transaction data sequence numbers, and acquiring at least two pieces of transaction data from the execution queue in sequence, the at least two pieces of transaction data carrying contract information;
  executing contract services corresponding to the contract information carried by the at least two pieces of transaction data in parallel, and acquiring a read cache and a write cache of a parallel transaction generated by executing each contract service, the at least two pieces of transaction data comprising target transaction data;
  determining a write cache of a merged transaction in block caches respectively corresponding to the at least two blocks, and acquiring a read cache of an updated transaction corresponding to the target transaction data in the write cache of the merged transaction, a position or addition time of the transaction data corresponding to the write cache of the merged transaction in the execution queue being in front of the target transaction data;
  determining a write cache of the transaction to be merged of the target transaction data according to the read cache of the updated transaction, the read cache of the parallel transaction corresponding to the target transaction data and the write cache of the parallel transaction corresponding to the target transaction data; and
  merging the write cache of the transaction to be merged of the target transaction data into a block cache to which the target transaction data belongs, and continuously merging a write cache of the transaction to be merged of the transaction data next to the target transaction data.

20. The computer-readable storage medium according to claim 19, wherein the acquiring a read cache of an updated transaction corresponding to the target transaction data in the write cache of the merged transaction comprises:
  sequentially traversing the write cache of the merged transactions according to a block height sequence from high to low and a sequence of transaction data sequence numbers from large to small to obtain the write cache of the merged transaction to be read for the target transaction data; and
  generating the read cache of the updated transaction according to the write cache of the merged transaction to be read for the target transaction data.

* * * * *